United States Patent
Shemesh et al.

(10) Patent No.: US 12,244,634 B2
(45) Date of Patent: Mar. 4, 2025

(54) TECHNIQUES FOR CYBERSECURITY IDENTITY RISK DETECTION UTILIZING DISK CLONING AND UNIFIED IDENTITY MAPPING

(71) Applicant: Wiz, Inc., New York, NY (US)

(72) Inventors: Daniel Hershko Shemesh, Givat-Shmuel (IL); Yarin Miran, Rishon Lezion (IL); Roy Reznik, Tel Aviv (IL); Ami Luttwak, Binyamina (IL); Yinon Costica, Tel Aviv (IL); Avihai Berkovitz, Tel Aviv (IL); George Pisha, Giv'atayim (IL); Yaniv Joseph Oliver, Tel Aviv (IL); Udi Reitblat, New York (IL); Or Heller, Tel Aviv (IL); Raaz Herzberg, Tel Aviv (IL); Osher Hazan, Mazkeret Batia (IL); Niv Roit Ben David, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/647,897

(22) Filed: Apr. 26, 2024

(65) Prior Publication Data

US 2024/0275812 A1    Aug. 15, 2024

Related U.S. Application Data

(63) Continuation of application No. 18/400,626, filed on Dec. 29, 2023, which is a continuation-in-part of
(Continued)

(51) Int. Cl.
*H04L 9/40* (2022.01)
*G06F 21/53* (2013.01)
(Continued)

(52) U.S. Cl.
CPC ........ *H04L 63/1433* (2013.01); *H04L 63/105* (2013.01); *H04L 63/1416* (2013.01); *H04L 67/1097* (2013.01)

(58) Field of Classification Search
CPC .......................... H04L 63/1433; H04L 63/105
(Continued)

(56) References Cited

U.S. PATENT DOCUMENTS 6,910,132 B1    6/2005    Bhattacharya
7,627,652 B1    12/2009   Commons et al.
(Continued)

FOREIGN PATENT DOCUMENTS

EP    4160983 A1    4/2023
EP    4254869 A2    10/2023
(Continued)

OTHER PUBLICATIONS

Siqi Ma; Certified Copy? Understanding Security Risks of Wi-Fi Hotspot based Android Data Clone Services; ACM:Year:2021; pp. 320-331.*
(Continued)

*Primary Examiner* — Monjur Rahim
(74) *Attorney, Agent, or Firm* — M&B IP Analysts, LLC

(57) ABSTRACT

A system and method for detecting a permission escalation event in a computing environment is disclosed. The method includes: generating a cloned disk based on an original disk of a resource deployed in a computing environment; detecting an identifier of a first principal on the cloned disk; detecting a second principal in the computing environment, the first principal authorized to assume the first principal; storing a representation of the computing environment in a security database, including: a first principal node representing the first principal, and a second principal node representing the second principal, further associated with a per-
(Continued)

mission; querying the representation to determine a permission of the first principal; determining that the second principal includes a permission which the first principal does not include based on a result of querying the representation; and generating a permission escalation event.

18 Claims, 12 Drawing Sheets

Related U.S. Application Data application No. 18/148,070, filed on Dec. 29, 2022, which is a continuation-in-part of application No. 18/055,180, filed on Nov. 14, 2022, said application No. 18/400,626 is a continuation-in-part of application No. 17/812,918, filed on Jul. 15, 2022, and a continuation-in-part of application No. 17/812,909, filed on Jul. 15, 2022, and a continuation-in-part of application No. 17/664,508, filed on May 23, 2022, and a continuation-in-part of application No. 17/654,668, filed on Mar. 14, 2022.

(60) Provisional application No. 63/267,368, filed on Jan. 31, 2022, provisional application No. 63/283,376, filed on Nov. 26, 2021, provisional application No. 63/283,379, filed on Nov. 26, 2021, provisional application No. 63/283,378, filed on Nov. 26, 2021, provisional application No. 63/264,550, filed on Nov. 24, 2021, provisional application No. 63/222,714, filed on Jul. 16, 2021, provisional application No. 63/222,719, filed on Jul. 16, 2021, provisional application No. 63/222,709, filed on Jul. 16, 2021.

(51) Int. Cl.
*G06F 21/55* (2013.01)
*G06F 21/62* (2013.01)
*H04L 67/1097* (2022.01)

(58) Field of Classification Search
USPC .......................................................... 726/22
See application file for complete search history.

(56) References Cited

U.S. PATENT DOCUMENTS

| | | | |
|---|---|---|---|
| 7,784,101 B2 | 8/2010 | Verbowski et al. |
| 8,200,965 B2 | 6/2012 | Fujibayashi et al. |
| 8,352,431 B1* | 1/2013 | Protopopov | G06F 16/128 |
| | | | 707/649 |
| 8,412,688 B1* | 4/2013 | Armangau | G06F 16/128 |
| | | | 707/703 |
| 8,413,239 B2 | 4/2013 | Sutton |
| 8,417,967 B2 | 4/2013 | Foster et al. |
| 8,499,354 B1 | 7/2013 | Satish et al. |
| 8,595,822 B2 | 11/2013 | Schrecker et al. |
| 8,701,200 B2 | 4/2014 | Naldurg et al. |
| 8,789,049 B2 | 7/2014 | Hutchins et al. |
| 8,898,481 B1 | 11/2014 | Osburn, III et al. |
| 8,914,406 B1 | 12/2014 | Haugsnes |
| 9,009,836 B1 | 4/2015 | Yarykin et al. |
| 9,094,379 B1 | 7/2015 | Miller |
| 9,119,017 B2 | 8/2015 | Sinha |
| 9,165,142 B1 | 10/2015 | Sanders et al. |
| 9,172,621 B1 | 10/2015 | Dippenaar |
| 9,330,273 B2 | 5/2016 | Khetawat et al. |
| 9,369,433 B1 | 6/2016 | Paul |
| 9,419,996 B2 | 8/2016 | Porat |
| 9,438,634 B1 | 9/2016 | Ross et al. |
| 9,467,473 B2 | 10/2016 | Jayaraman |
| 9,544,327 B1 | 1/2017 | Sharma et al. |
| 9,563,385 B1 | 2/2017 | Kowalski et al. |
| 9,569,328 B2 | 2/2017 | Pavlov et al. |
| 9,582,662 B1 | 2/2017 | Messick et al. |
| 9,596,235 B2 | 3/2017 | Badam et al. |
| 9,607,104 B1 | 3/2017 | Turner et al. |
| 9,646,172 B1 | 5/2017 | Hahn |
| 9,661,009 B1 | 5/2017 | Karandikar et al. |
| 9,672,355 B2 | 6/2017 | Titonis et al. |
| 9,712,503 B1 | 7/2017 | Ahmed |
| 9,892,261 B2 | 2/2018 | Joram et al. |
| 10,002,247 B2 | 6/2018 | Suarez et al. |
| 10,032,032 B2 | 7/2018 | Suarez et al. |
| 10,063,445 B1 | 8/2018 | Preece |
| 10,135,826 B2 | 11/2018 | Reddy |
| 10,229,125 B2 | 3/2019 | Goodman et al. |
| 10,255,370 B2 | 4/2019 | Carpenter et al. |
| 10,360,025 B2 | 7/2019 | Foskett et al. |
| 10,412,103 B2 | 9/2019 | Haugsnes |
| 10,412,109 B2* | 9/2019 | Loureiro | G06F 21/577 |
| 10,459,664 B1* | 10/2019 | Dreier | G06F 16/907 |
| 10,503,904 B1 | 12/2019 | Singh et al. |
| 10,536,471 B1* | 1/2020 | Derbeko | G06F 21/53 |
| 10,540,499 B2 | 1/2020 | Wailly et al. |
| 10,552,610 B1* | 2/2020 | Vashisht | G06F 3/0619 |
| 10,554,507 B1 | 2/2020 | Siddiqui et al. |
| 10,567,468 B2 | 2/2020 | Perlmutter |
| 10,572,226 B2 | 2/2020 | Biskup et al. |
| 10,574,675 B2 | 2/2020 | Peppe et al. |
| 10,623,386 B1 | 4/2020 | Bernat et al. |
| 10,630,642 B2 | 4/2020 | Clark et al. |
| 10,664,619 B1 | 5/2020 | Marelas |
| 10,691,636 B2 | 6/2020 | Tabaaloute et al. |
| 10,721,260 B1 | 7/2020 | Schlarp et al. |
| 10,725,775 B2 | 7/2020 | Suarez et al. |
| 10,735,430 B1 | 8/2020 | Stoler |
| 10,735,442 B1 | 8/2020 | Swackhamer |
| 10,791,138 B1 | 9/2020 | Siddiqui et al. |
| 10,803,188 B1 | 10/2020 | Rajput et al. |
| 10,831,898 B1 | 11/2020 | Wagner |
| 10,915,626 B2 | 2/2021 | Tang |
| 10,924,503 B1 | 2/2021 | Pereira et al. |
| 10,972,484 B1 | 4/2021 | Swackhamer |
| 10,997,293 B2 | 5/2021 | Wiest et al. |
| 11,005,860 B1 | 5/2021 | Glyer et al. |
| 11,016,954 B1 | 5/2021 | Babocichin et al. |
| 11,044,118 B1 | 6/2021 | Reed et al. |
| 11,055,414 B2 | 7/2021 | Claes |
| 11,064,032 B1 | 7/2021 | Yang et al. |
| 11,099,976 B2 | 8/2021 | Khakare et al. |
| 11,102,231 B2 | 8/2021 | Kraning et al. |
| 11,165,652 B1 | 11/2021 | Byrne |
| 11,216,563 B1* | 1/2022 | Veselov | H04L 63/1408 |
| 11,245,730 B2 | 2/2022 | Bailey |
| 11,271,961 B1 | 3/2022 | Berger |
| 11,334,670 B2* | 5/2022 | Franco | G06F 21/645 |
| 11,366,897 B1 | 6/2022 | Ramanathan et al. |
| 11,388,183 B2 | 7/2022 | Hoopes et al. |
| 11,405,426 B2 | 8/2022 | Nguyen |
| 11,444,974 B1 | 9/2022 | Shakhzadyan |
| 11,483,317 B1 | 10/2022 | Bolignano et al. |
| 11,496,498 B2 | 11/2022 | Wright et al. |
| 11,496,519 B1 | 11/2022 | Gupta et al. |
| 11,503,063 B2 | 11/2022 | Rao |
| 11,507,672 B1 | 11/2022 | Pagnozzi et al. |
| 11,516,222 B1 | 11/2022 | Srinivasan et al. |
| 11,520,907 B1 | 12/2022 | Borowiec et al. |
| 11,546,360 B2 | 1/2023 | Woodford et al. |
| 11,556,659 B1 | 1/2023 | Kumar et al. |
| 11,558,401 B1 | 1/2023 | Vashisht et al. |
| 11,558,423 B2 | 1/2023 | Gordon et al. |
| 11,567,751 B2 | 1/2023 | Cosentino et al. |
| 11,570,090 B2 | 1/2023 | Shen et al. |
| 11,575,696 B1 | 2/2023 | Ithal et al. |
| 11,614,956 B2 | 3/2023 | Tsirkin et al. |
| 11,645,390 B2 | 5/2023 | Vijayvargiya et al. |
| 11,662,928 B1 | 5/2023 | Kumar et al. |
| 11,663,340 B2* | 5/2023 | Wu | G06F 11/1451 |
| | | | 726/25 |
| 11,669,386 B1 | 6/2023 | Abrol |

(56) References Cited

U.S. PATENT DOCUMENTS

| | | |
|---|---|---|
| 11,700,233 B2 | 7/2023 | St. Pierre |
| 11,750,566 B1 | 9/2023 | Montilla Lugo |
| 11,757,844 B2 | 9/2023 | Xiao |
| 11,770,398 B1 | 9/2023 | Erlingsson |
| 11,792,284 B1 | 10/2023 | Nanduri |
| 11,799,874 B1 | 10/2023 | Lichtenstein et al. |
| 11,803,766 B1 | 10/2023 | Srinivasan |
| 11,841,945 B1 | 12/2023 | Fogel et al. |
| 11,914,707 B1 | 2/2024 | Ramanathan et al. |
| 11,922,220 B2 | 3/2024 | Haghighat et al. |
| 11,936,785 B1 | 3/2024 | Shemesh et al. |
| 12,019,770 B2 | 6/2024 | Nilsson et al. |
| 12,050,696 B2 | 7/2024 | Pieno et al. |
| 12,058,177 B2 | 8/2024 | Crabtree et al. |
| 2003/0188194 A1 | 10/2003 | Currie et al. |
| 2003/0217039 A1 | 11/2003 | Kurtz et al. |
| 2005/0050365 A1 | 3/2005 | Seki et al. |
| 2005/0251863 A1 | 11/2005 | Sima |
| 2005/0283645 A1 | 12/2005 | Turner et al. |
| 2007/0174915 A1 | 7/2007 | Gribble et al. |
| 2007/0271360 A1 | 11/2007 | Sahita et al. |
| 2008/0075283 A1 | 3/2008 | Takahashi |
| 2008/0221833 A1 | 9/2008 | Brown et al. |
| 2008/0307020 A1 | 12/2008 | Ko et al. |
| 2008/0320594 A1 | 12/2008 | Jiang |
| 2009/0106256 A1* | 4/2009 | Safari ............... H04L 41/50 |
| 2009/0271863 A1 | 10/2009 | Govindavajhala et al. |
| 2010/0242082 A1 | 9/2010 | Keene et al. |
| 2010/0281275 A1 | 11/2010 | Lee et al. |
| 2011/0055361 A1 | 3/2011 | Dehaan |
| 2011/0276806 A1 | 11/2011 | Casper et al. |
| 2012/0110651 A1 | 5/2012 | Van Biljon et al. |
| 2012/0297206 A1 | 11/2012 | Nord et al. |
| 2013/0024940 A1 | 1/2013 | Hutchins et al. |
| 2013/0054890 A1 | 2/2013 | Desai et al. |
| 2013/0124669 A1 | 5/2013 | Anderson et al. |
| 2013/0160119 A1 | 6/2013 | Sartin |
| 2013/0160129 A1 | 6/2013 | Sartin |
| 2013/0290708 A1 | 10/2013 | Diaz et al. |
| 2014/0096134 A1 | 4/2014 | Barak |
| 2014/0115578 A1 | 4/2014 | Cooper et al. |
| 2014/0237537 A1 | 8/2014 | Manmohan |
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0163192 A1 | 6/2015 | Jain |
| 2015/0172321 A1 | 6/2015 | Kirti et al. |
| 2015/0254364 A1 | 9/2015 | Piduri et al. |
| 2015/0304302 A1 | 10/2015 | Zhang et al. |
| 2015/0310215 A1 | 10/2015 | McBride et al. |
| 2015/0319160 A1 | 11/2015 | Ferguson et al. |
| 2016/0063466 A1 | 3/2016 | Sheridan et al. |
| 2016/0078231 A1 | 3/2016 | Bach et al. |
| 2016/0103669 A1 | 4/2016 | Gamage et al. |
| 2016/0105454 A1 | 4/2016 | Li et al. |
| 2016/0140352 A1 | 5/2016 | Nickolov |
| 2016/0156664 A1 | 6/2016 | Nagaratnam |
| 2016/0224600 A1 | 8/2016 | Munk |
| 2016/0299708 A1 | 10/2016 | Yang et al. |
| 2016/0366185 A1 | 12/2016 | Lee et al. |
| 2017/0026416 A1 | 1/2017 | Carpenter et al. |
| 2017/0070506 A1 | 3/2017 | Reddy |
| 2017/0104755 A1 | 4/2017 | Arregoces |
| 2017/0111384 A1 | 4/2017 | Loureiro et al. |
| 2017/0185784 A1 | 6/2017 | Madou |
| 2017/0187743 A1 | 6/2017 | Madou |
| 2017/0223024 A1 | 8/2017 | Desai |
| 2017/0230179 A1 | 8/2017 | Mannan et al. |
| 2017/0237560 A1 | 8/2017 | Mueller et al. |
| 2017/0257347 A1 | 9/2017 | Yan |
| 2017/0285978 A1 | 10/2017 | Manasse |
| 2017/0034198 A1 | 12/2017 | Powers et al. |
| 2017/0374136 A1 | 12/2017 | Ringdahl |
| 2018/0004950 A1 | 1/2018 | Gupta et al. |
| 2018/0007087 A1 | 1/2018 | Grady et al. |
| 2018/0026995 A1 | 1/2018 | Dufour et al. |
| 2018/0027009 A1 | 1/2018 | Santos |
| 2018/0063290 A1 | 3/2018 | Yang et al. |
| 2018/0150412 A1 | 5/2018 | Manasse |
| 2018/0159882 A1 | 6/2018 | Brill |
| 2018/0181310 A1 | 6/2018 | Feinberg et al. |
| 2018/0191726 A1 | 7/2018 | Luukkala |
| 2018/0219888 A1 | 8/2018 | Apostolopoulos |
| 2018/0234459 A1 | 8/2018 | Kung |
| 2018/0239902 A1 | 8/2018 | Godard |
| 2018/0260566 A1 | 9/2018 | Chaganti et al. |
| 2018/0270268 A1 | 9/2018 | Gorodissky et al. |
| 2018/0276084 A1 | 9/2018 | Mitkar et al. |
| 2018/0278639 A1 | 9/2018 | Bernstein et al. |
| 2018/0288129 A1 | 10/2018 | Joshi et al. |
| 2018/0309747 A1 | 10/2018 | Sweet et al. |
| 2018/0321993 A1 | 11/2018 | McClory |
| 2018/0341768 A1 | 11/2018 | Marshall et al. |
| 2018/0359058 A1 | 12/2018 | Kurian |
| 2018/0359059 A1 | 12/2018 | Kurian |
| 2019/0007271 A1 | 1/2019 | Rickards et al. |
| 2019/0043201 A1 | 2/2019 | Strong et al. |
| 2019/0058722 A1 | 2/2019 | Levin et al. |
| 2019/0068617 A1 | 2/2019 | Coleman |
| 2019/0068627 A1 | 2/2019 | Thampy |
| 2019/0104140 A1 | 4/2019 | Gordeychik et al. |
| 2019/0116111 A1 | 4/2019 | Izard et al. |
| 2019/0121986 A1 | 4/2019 | Stopel et al. |
| 2019/0132350 A1 | 5/2019 | Smith et al. |
| 2019/0149604 A1 | 5/2019 | Jahr |
| 2019/0166129 A1 | 5/2019 | Gaetjen et al. |
| 2019/0171811 A1 | 6/2019 | Daniel et al. |
| 2019/0191417 A1 | 6/2019 | Baldemair et al. |
| 2019/0205267 A1 | 7/2019 | Richey et al. |
| 2019/0207966 A1 | 7/2019 | Vashisht et al. |
| 2019/0220575 A1 | 7/2019 | Boudreau et al. |
| 2019/0245883 A1 | 8/2019 | Gorodissky et al. |
| 2019/0260764 A1 | 8/2019 | Humphrey et al. |
| 2019/0278928 A1 | 9/2019 | Rungta et al. |
| 2019/0354675 A1 | 11/2019 | Gan et al. |
| 2019/0377988 A1 | 12/2019 | Qi et al. |
| 2020/0007314 A1 | 1/2020 | Vouk et al. |
| 2020/0007569 A1 | 1/2020 | Dodge et al. |
| 2020/0012659 A1 | 1/2020 | Dageville et al. |
| 2020/0012818 A1 | 1/2020 | Levin et al. |
| 2020/0028862 A1 | 1/2020 | Lin |
| 2020/0044916 A1 | 2/2020 | Kaufman et al. |
| 2020/0050440 A1 | 2/2020 | Chuppala et al. |
| 2020/0082094 A1 | 3/2020 | McAllister et al. |
| 2020/0106782 A1 | 4/2020 | Sion |
| 2020/0125352 A1 | 4/2020 | Kannan |
| 2020/0145405 A1 | 5/2020 | Bosch et al. |
| 2020/0244678 A1* | 7/2020 | Shua ............... G06F 21/552 |
| 2020/0244692 A1* | 7/2020 | Shua ............... G06F 11/3476 |
| 2020/0259852 A1 | 8/2020 | Wolff et al. |
| 2020/0287927 A1 | 9/2020 | Zadeh et al. |
| 2020/0320845 A1 | 10/2020 | Livny et al. |
| 2020/0336489 A1 | 10/2020 | Wuest et al. |
| 2020/0382556 A1 | 12/2020 | Woolward et al. |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0026932 A1 | 1/2021 | Boudreau et al. |
| 2021/0042263 A1* | 2/2021 | Zdornov ............ G06F 11/3466 |
| 2021/0089662 A1 | 3/2021 | Muniswamy-Reddy et al. |
| 2021/0105304 A1 | 4/2021 | Kraning et al. |
| 2021/0144517 A1 | 5/2021 | Guim Bernat et al. |
| 2021/0149788 A1 | 5/2021 | Downie |
| 2021/0158835 A1 | 5/2021 | Hill et al. |
| 2021/0168150 A1 | 6/2021 | Ross et al. |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0200881 A1 | 7/2021 | Joshi et al. |
| 2021/0203684 A1 | 7/2021 | Maor et al. |
| 2021/0211453 A1 | 7/2021 | Cooney |
| 2021/0216630 A1 | 7/2021 | Karr |

(56) References Cited

U.S. PATENT DOCUMENTS

| | | |
|---|---|---|
| 2021/0218567 A1 | 7/2021 | Richards et al. |
| 2021/0226812 A1 | 7/2021 | Park |
| 2021/0226928 A1 | 7/2021 | Crabtree et al. |
| 2021/0234889 A1 | 7/2021 | Burle et al. |
| 2021/0263802 A1* | 8/2021 | Gottemukkula .... G06F 11/1461 |
| 2021/0306416 A1 | 9/2021 | Mukhopadhyay et al. |
| 2021/0314342 A1 | 10/2021 | Oberg |
| 2021/0320794 A1 | 10/2021 | Auh et al. |
| 2021/0329019 A1 | 10/2021 | Shua et al. |
| 2021/0334386 A1 | 10/2021 | AlGhamdi et al. |
| 2021/0357246 A1 | 11/2021 | Kumar et al. |
| 2021/0360032 A1 | 11/2021 | Crabtree et al. |
| 2021/0368045 A1 | 11/2021 | Verma |
| 2021/0382995 A1 | 12/2021 | Massiglia et al. |
| 2021/0382997 A1 | 12/2021 | Yi et al. |
| 2021/0409486 A1 | 12/2021 | Martinez |
| 2022/0012771 A1 | 1/2022 | Gustafson |
| 2022/0030020 A1 | 1/2022 | Huffman |
| 2022/0053011 A1 | 2/2022 | Rao et al. |
| 2022/0086173 A1 | 3/2022 | Yavo et al. |
| 2022/0131888 A1 | 4/2022 | Kanso |
| 2022/0156396 A1 | 5/2022 | Bednash et al. |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor |
| 2022/0232042 A1 | 7/2022 | Crabtree et al. |
| 2022/0247791 A1 | 8/2022 | Duminuco et al. |
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0327119 A1 | 10/2022 | Gasper et al. |
| 2022/0342690 A1 | 10/2022 | Shua |
| 2022/0342997 A1 | 10/2022 | Watanabe et al. |
| 2022/0345481 A1 | 10/2022 | Shua |
| 2022/0350931 A1 | 11/2022 | Shua |
| 2022/0357992 A1 | 11/2022 | Karpovsky |
| 2022/0374519 A1* | 11/2022 | Botelho .............. G06F 9/45558 |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0040635 A1 | 2/2023 | Narayan |
| 2023/0075355 A1 | 3/2023 | Twigg |
| 2023/0087093 A1 | 3/2023 | Ithal et al. |
| 2023/0093527 A1 | 3/2023 | Shua |
| 2023/0095756 A1 | 3/2023 | Wilkinson et al. |
| 2023/0110080 A1 | 4/2023 | Hen |
| 2023/0123477 A1 | 4/2023 | Luttwak et al. |
| 2023/0125134 A1 | 4/2023 | Raleigh et al. |
| 2023/0134674 A1 | 5/2023 | Quinn et al. |
| 2023/0135240 A1 | 5/2023 | Cody et al. |
| 2023/0136839 A1 | 5/2023 | Sundararajan et al. |
| 2023/0164148 A1 | 5/2023 | Narayan |
| 2023/0164182 A1 | 5/2023 | Kothari et al. |
| 2023/0169165 A1 | 6/2023 | Williams et al. |
| 2023/0171271 A1 | 6/2023 | Williams et al. |
| 2023/0192418 A1 | 6/2023 | Horowitz et al. |
| 2023/0208870 A1* | 6/2023 | Yellapragada .......... G06F 21/53 726/22 |
| 2023/0224319 A1 | 7/2023 | Isoyama et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1 | 10/2023 | Vijayan et al. |
| 2023/0336550 A1 | 10/2023 | Lidgi et al. |
| 2023/0336578 A1 | 10/2023 | Lidgi et al. |
| 2023/0376586 A1 | 11/2023 | Shemesh et al. |
| 2024/0007492 A1 | 1/2024 | Shen et al. |
| 2024/0037229 A1 | 2/2024 | Pabón et al. |
| 2024/0045838 A1 | 2/2024 | Reiss et al. |
| 2024/0073115 A1 | 2/2024 | Chakraborty et al. |
| 2024/0080329 A1 | 3/2024 | Reed et al. |
| 2024/0080332 A1 | 3/2024 | Ganesh et al. |
| 2024/0146818 A1 | 5/2024 | Cody et al. |
| 2024/0241752 A1 | 7/2024 | Crabtree et al. |

FOREIGN PATENT DOCUMENTS

| | | |
|---|---|---|
| RU | 2421792 C2 | 6/2011 |
| SG | 10202009702 | 4/2021 |

OTHER PUBLICATIONS

Sahil Suneja; Safe Inspection of Live Virtual Machines; IEEE; Year:2017; pp. 97-111.

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/ stamp.jsp?tp=&arnumber=9014355 (Year: 2019).

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).

Leibenger, Dominik et al. EncFS goes multi-user: Adding access control to an encrypted file system. 2016 IEEE Conference on Communications and Network Security (CNS). https://ieeexoplore.ieee.org/stamp/stamp.jsp?tp=&arnumber=7860544 (Year: 2016).

Safaryan, Olga A et al. Cryptographic Algorithm Implementation for Data Encryption in DBMS MS SQL Server. 2020 IEEE East-West Design & Test Symposium (EWDTS). https://ieeexplore.ieee.org/stamp/stamp.jsp?tp=&arnumber=9224775 (Year: 2020).

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/ stamp.jsp?tp=&arnumber=9250645 (Year: 2020).

Ali Gholami; Security and Privacy of Sensitive Data in Cloud Computing: a Survey of Recent Developments; ARIX:2016; pp. 131-150.

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://Ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Kumar, Anuj et al. A New Approach for Security in Cloud Data Storage for IOT Applications Using Hybrid Cryptography Technique. 2020 International Conference on Power Electronics & IoT

(56) References Cited

OTHER PUBLICATIONS

Applications in Renewable Energy and its Control. https://ieeexplore.ieee.org/stamp/stamp.jsp?tp=&arnumber=9087010 (Year: 2020).

Microsoft Build. "Introduction to Azure managed disks". Aug. 21, 2023, https://docs.microsoft.com/en-us/azure/virtual-machines/managed-disks-overview.

Microsoft Docs. "Create a VM from a managed image". Article. Jan. 5, 2022. https://docs.microsoft.com/en-us/azure/virtual-machines/windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).

Shuvo, Arfatul Mowla et al. Storage Efficient Data Security Model for Distributed Cloud Storage. 2020 IEEE 8th R10 Humanitarian Technology Conference (R10-HTC). https://Ieeexplore.ieee.org/stamp/stamp.jsp?tp=&arnumber=9356962 (Year: 2020).

Written Opinion of the International Searching Authority for PCT Application No. PCT/IB2022/060940 dated Feb. 1, 2023. The International Bureau of WIPO.

Written Opinion of the International Searching Authority, PCT/IB23/55312. ISA/US Commissioner for Patents, Alexandria, Virginia. Dated Aug. 30, 2023.

Written Opinion of the Searching Authority for PCT/IB2023/050848, dated May 9, 2023. International Bureau of WIPO.

Written Opinion of the Searching Authority of PCT/IB2023/058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://www.biomedcentral.com/1471-2105/15/110.

\* cited by examiner

TECHNIQUES FOR CYBERSECURITY IDENTITY RISK DETECTION UTILIZING DISK CLONING AND UNIFIED IDENTITY MAPPING

CROSS-REFERENCE TO RELATED APPLICATIONS

This application is a continuation of U.S. Non-Provisional application Ser. No. 18/400,626 filed Dec. 29, 2023, which itself is a continuation-in-part of U.S. Non-Provisional patent application Ser. No. 17/664,508 filed May 23, 2022, U.S. Non-Provisional patent application Ser. No. 17/654,668 filed Mar. 14, 2022, and U.S. Non-Provisional patent application Ser. No. 17/812,909 filed Jul. 15, 2022, U.S. Non-Provisional patent application Ser. No. 17/812,918 filed Jul. 15, 2022, and U.S. Non-Provisional patent application Ser. No. 18/148,070 filed Dec. 29, 2022.

U.S. Non-Provisional patent application Ser. No. 17/654,668 claims priority from U.S. Provisional Patent Application No. 63/222,709 filed Jul. 16, 2021.

U.S. Non-Provisional patent application Ser. No. 17/812,909 claims priority from U.S. Provisional Patent Application No. 63/222,714 filed Jul. 16, 2021.

U.S. Non-Provisional patent application Ser. No. 17/812,918 claims priority from U.S. Provisional Application No. 63/222,719 filed on Jul. 16, 2021.

U.S. Non-Provisional patent application Ser. No. 18/148,070 is a continuation-in-part of U.S. Non-Provisional patent application Ser. No. 18/055,180 filed Nov. 14, 2022.

U.S. Non-Provisional patent application Ser. No. 18/055,180 claims priority from: U.S. Provisional Patent Application No. 63/264,550, filed Nov. 24, 2021, U.S. Provisional Patent Application No. 63/283,376, filed Nov. 26, 2021, U.S. Provisional Patent Application No. 63/283,378, filed Nov. 26, 2021, U.S. Provisional Patent Application No. 63/283,379, filed Nov. 26, 2021. U.S. Non-Provisional patent application Ser. No. 18/148,070 claims benefit of U.S. Provisional Patent Application No. 63/267,368 filed Jan. 31, 2022.

All contents of the above referenced applications are hereby incorporated by reference herein.

TECHNICAL FIELD

The present disclosure relates generally to cybersecurity, and specifically to the execution of cybersecurity risk monitoring and response procedures utilizing resource reduction techniques applied to unified identity mapping and principal access evaluation.

BACKGROUND

Organizations are increasingly turning to hybrid and multi-cloud platform solutions. Such solutions utilize multiple public cloud computing environments, or combinations of private and public cloud computing environments. Cloud computing environments, such as Amazon® Web Services (AWS), Microsoft® Azure, Google® Cloud platform, and the like, may offer similar functionalities, but often have different implementations, even for similar technology stacks. For example, a container engine deployed in AWS is deployed differently than in Azure. However, each of these platforms may provide different benefits to an organization, which makes it worthwhile to maintain such structures.

A drawback of having a multi-cloud solution is that managing different cloud entities across multiple platforms has increased complexity, especially where the platforms do not offer a bridging solution. Managing access within a cloud computing environment, and between cloud computing environments is crucial for cybersecurity purposes, as mismanaged access can result in mistakes (e.g., a junior grade user shutting down a server) or active cybersecurity threats, such as data theft.

Cloud computing environments contain cloud entities such as principals and resources. A principal is a cloud entity that may initiate actions in the cloud computing environment and act on resources. A principal may be a user account, for example. A resource is a cloud entity which provides access to computing resources such as storage, memory, processors, and the like, or services, such as web applications. In order to understand which of these cloud entities may access others, an administrator must check, for each cloud entity, whether it can access, or be accessed by, every other cloud entity.

Accessing a cloud computing environment allows an attacker to potentially access sensitive data or utilize the resources of the cloud computing environment for other purposes, such as mining cryptocurrency. It is therefore of primary importance to detect vulnerabilities and exposures in the cloud computing environment, and in workloads such as virtual machines, containers, and serverless functions, deployed therein.

Current solutions to cloud workload vulnerability scanning challenges require the deployment of specialized tools, including scanning agents directed to maintenance of virtual machines (VMs), where operation and maintenance of such tools may be costly, time-consuming, or both. Agent-dependent processes fail to provide for scanning of containers, such as containers managed using Kubernetes®, and other, like, container-management platforms, and may fail to provide for coverage of serverless applications. Existing agent-implementation processes or solutions fail to provide for full cloud workload vulnerability scanning, additional methods, such as snapshot-based scanning, may supplement implemented solutions.

Snapshot-based scanning, wherein static "snapshots" of processes, services, data, and the like, are analyzed in an environment separate from the source environment, provides for agentless scanning. Snapshot-based scanning is applied in various fields, including computer forensics, to provide for analysis of services, processes, data, and the like, in locations or environments other than those from which the snapshots are collected, as well as retrospective analysis. However, the applicability of snapshot-based scanning is limited in multi-tenant systems, such as shared cloud platforms, as cloud tenants may desire high levels of data protection during snapshot generation, transfer, and analysis.

Further, snapshot-based scanning methods, as well as hybrid methods including both agent-implemented and snapshot-based methods, may be inapplicable to certain cloud system structures and environments, which may include various objects, processes, and the like, which such methods may not be configured to process, as such processing may require, as examples, separate analysis of container repositories, VM snapshots, and application programming interfaces (API) for serverless applications, where existing solutions fail to provide such integrated functionality.

Collectively, using agent-implemented scanning, snapshot-based scanning, and methods able to adequately address the scanning of assets beyond the capture of the two can lead to a large and complicated calculation requiring large compute and memory resources to accomplish, and in most cases, it is not a feasible solution. Furthermore, this complication makes detecting a type of cybersecurity threat known as privilege escalation (or permission escalation) difficult. Privilege escalation is where an unauthorized user account gains access to rights, permissions, privileges, and the like in a cloud computing environment which it should not have.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting a permission escalation event. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include generating a cloned disk based on an original disk of a resource deployed in a computing environment. Method may also include detecting an identifier of a first principal on the cloned disk. Method may furthermore include detecting a second principal in the computing environment, where the first principal is authorized to assume the first principal. Method may in addition include storing a representation of the computing environment in a security database, the representation including: a first principal node representing the first principal, and a second principal node representing the second principal, the second principal node further associated with a permission. Method may moreover include querying the representation to determine a permission of the first principal; determining that the second principal includes a permission which the first principal does not include based on a result of querying the representation; and generating a permission escalation event in response to determining that the second principal includes a permission which the first principal does not include. Other embodiments of this aspect include corresponding computer systems, apparatus, and computer programs recorded on one or more computer storage devices, each configured to perform the actions of the methods.

Implementations may include one or more of the following features. Method may include: determining that a permission associated with the first principal node is granted by the second principal; and determining that the permission escalation event is triggered by granting the permission. Method may include: querying the security database to detect a third principal node representing a third principal deployed in a second computing environment, where the third principal includes a permission to assume the first principal. Method may include: determining an effective permission of the first principal. Method where determining an effective permission further comprises: determining a plurality of secondary principals, where the first principal is configured to assume each secondary principal; and determining a permission for each secondary principal. Method where the effective permission includes each determined permission. Method may include: detecting a group of principals including the first principal in the security database, where the security database is a security graph stored on a graph database. Method where detecting the group of principals further comprises: applying maximal biclique detection on the security graph. Method may include: determining an effective permission for the group of principals by determining an effective permission of the first principal. Method may include: releasing the cloned disk in response to completing inspection of the cloned disk. Method may include: inspecting the cloned disk for a cybersecurity object. Method may include: storing a representation of the cybersecurity object in the security database, in response to detecting the cybersecurity object in the cloned disk. Implementations of the described techniques may include hardware, a method or process, or a computer tangible medium.

In one general aspect, non-transitory computer-readable medium may include one or more instructions that, when executed by one or more processors of a device, cause the device to: generate a cloned disk based on an original disk of a resource deployed in a computing environment. Medium may furthermore detect an identifier of a first principal on the cloned disk. Medium may in addition detect a second principal in the computing environment, where the first principal is authorized to assume the first principal. Medium may moreover store a representation of the computing environment in a security database, the representation including: a first principal node represent the first principal, and a second principal node representing the second principal, the second principal node further associated with a permission. Medium may also query the representation to determine a permission of the first principal. Medium may furthermore determine that the second principal includes a permission which the first principal does not include based on a result of querying the representation. Medium may in addition generate a permission escalation event in response to determining that the second principal includes a permission which the first principal does not include. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: generate a cloned disk based on an original disk of a resource deployed in a computing environment. System may in addition detect an identifier of a first principal on the cloned disk. System may moreover detect a second principal in the computing environment, where the first principal is authorized to assume the first principal. System may also store a representation of the computing environment in a security database, the representation including: a first principal node represent the first principal, and a second principal node representing the second principal, the second principal node further associated with a permission. System may furthermore query the representation to determine a permission of the first principal. System may in addition determine that the second principal includes a permission which the first principal does not include based on a result of querying the representation. System may moreover generate a permission escalation event in response to determining that the second principal includes a permission which the first principal does not include. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: determine that a permission associated with the first principal node is granted by the second principal; and determine that the permission escalation event is triggered by granting the permission. System where the memory contains further instructions which when executed by the processing circuitry further configure the system to: query the security database to detect a third principal node representing a third principal deployed in a second computing environment, where the third principal includes a permission to assume the first principal. System where the memory contains further instructions which when executed by the processing circuitry further configure the system to: determine an effective permission of the first principal. System where the memory contains further instructions that, when executed by the processing circuitry for determining an effective permission, further configure the system to: determine a plurality of secondary principals, where the first principal is configured to assume each secondary principal; and determine a permission for each secondary principal. System where the effective permission includes each determined permission. System where the memory contains further instructions which when executed by the processing circuitry further configure the system to: detect a group of principals including the first principal in the security database, where the security database is a security graph stored on a graph database. System where the memory contains further instructions that, when executed by the processing circuitry for detecting the group of principals, further configure the system to: apply maximal biclique detection on the security graph. System where the memory contains further instructions which when executed by the processing circuitry further configure the system to: determine an effective permission for the group of principals by determining an effective permission of the first principal. System where the memory contains further instructions which when executed by the processing circuitry further configure the system to: release the cloned disk in response to completing inspection of the cloned disk. System where the memory contains further instructions which when executed by the processing circuitry further configure the system to: inspect the cloned disk for a cybersecurity object. System where the memory contains further instructions which when executed by the processing circuitry further configure the system to: store a representation of the cybersecurity object in the security database, in response to detecting the cybersecurity object in the cloned disk. Implementations of the described techniques may include hardware, a method or process, or a computer tangible medium.

In one general aspect, method may include detecting a virtual instance deployed in a cloud computing environment, the virtual instance associated with an original disk. Method may also include generating a cloned disk based on the original disk, where the original disk includes a disk descriptor pointing to a storage address of a cloud storage system. Method may furthermore include generating a cloned disk descriptor associated with the cloned disk, the cloned disk descriptor pointing to the storage address. Method may in addition include inspecting the cloned disk for a cybersecurity object, the cybersecurity object indicating a cybersecurity risk. Method may moreover include releasing the cloned disk in response to completing inspection of the cloned disk. Other embodiments of this aspect include corresponding computer systems, apparatus, and computer programs recorded on one or more computer storage devices, each configured to perform the actions of the methods.

Implementations may include one or more of the following features. Method may include: dereferencing a pointer of the disk descriptor of the original disk; and generating a pointer for the cloned disk descriptor based on the dereferenced pointer of the disk descriptor of the original disk. Method may include: generating a representation in a security database of: the virtual instance, the original disk, and the cybersecurity object. Method may include: connecting the representation of the virtual instance with the representation of the cybersecurity object, in response to detecting the cybersecurity object on the cloned disk. Method where the security database includes a representation to the cloud computing environment. Method may include: determining that the original disk is an encrypted disk; detecting an encryption key utilized to decrypt the encrypted disk; and generating an encryption pointer for the cloned disk descriptor to the detected encryption key. Method may include: inspecting the cloned disk for any one of: an exposure, a vulnerability, a malware, a ransomware, a spyware, a bot, a weak password, an exposed password, an exposed certificate, a misconfiguration, a suspicious event, and any combination thereof. Method may include: accessing an inspection account in the cloud computing environment; and generating the cloned disk in the inspection account. Method may include: providing access to the cloned disk to an inspector workload, the inspector workload deployed in an inspection environment communicatively coupled with the cloud computing environment. Implementations of the described techniques may include hardware, a method or process, or a computer tangible medium.

In one general aspect, non-transitory computer-readable medium may include one or more instructions that, when executed by one or more processors of a device, cause the device to: detect a virtual instance deployed in a cloud computing environment, the virtual instance associated with an original disk; generate a cloned disk based on the original disk, where the original disk includes a disk descriptor pointing to a storage address of a cloud storage system; generate a cloned disk descriptor associated with the cloned disk, the cloned disk descriptor pointing to the storage address; inspect the cloned disk for a cybersecurity object, the cybersecurity object indicating a cybersecurity risk; and release the cloned disk in response to completing inspection of the cloned disk. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect a virtual instance deployed in a cloud computing environment, the virtual instance associated with an original disk. System may in addition generate a cloned disk based on the original disk, where the original disk includes a disk descriptor pointing to a storage address of a cloud storage system. System may moreover generate a cloned disk descriptor associated with the cloned disk, the cloned disk descriptor pointing to the storage address. System may also inspect the cloned disk for a cybersecurity object, the cybersecurity object indicating a cybersecurity risk. System may furthermore release the cloned disk in response to completing inspection of the cloned disk. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: dereference a pointer of the disk descriptor of the original disk; and generate a pointer for the cloned disk descriptor based on the dereferenced pointer of the disk descriptor of the original disk. System where the memory contains further instructions which when executed by the processing circuitry further configure the system to: generate a representation in a security database of: the virtual instance, the original disk, and the cybersecurity object. System where the memory contains further instructions which when executed by the processing circuitry further configure the system to: connect the representation of the virtual instance with the representation of the cybersecurity object, in response to detecting the cybersecurity object on the cloned disk. System where the security database includes a representation of the cloud computing environment. System where the memory contains further instructions which when executed by the processing circuitry further configure the system to: determine that the original disk is an encrypted disk; detect an encryption key utilized to decrypt the encrypted disk; and generate an encryption pointer for the cloned disk descriptor to the detected encryption key. System where the memory contains further instructions which when executed by the processing circuitry further configure the system to: inspect the cloned disk for any one of: an exposure, a vulnerability, a malware, a ransomware, a spyware, a bot, a weak password, an exposed password, an exposed certificate, a misconfiguration, a suspicious event, and any combination thereof. System where the memory contains further instructions which when executed by the processing circuitry further configure the system to: access an inspection account in the cloud computing environment; and generate the cloned disk in the inspection account. System where the memory contains further instructions which when executed by the processing circuitry further configure the system to: provide access to the cloned disk to an inspector workload, the inspector workload deployed in an inspection environment communicatively coupled with the cloud computing environment. Implementations of the described techniques may include hardware, a method or process, or a computer tangible medium.

DETAILED DESCRIPTION

Figure 1:
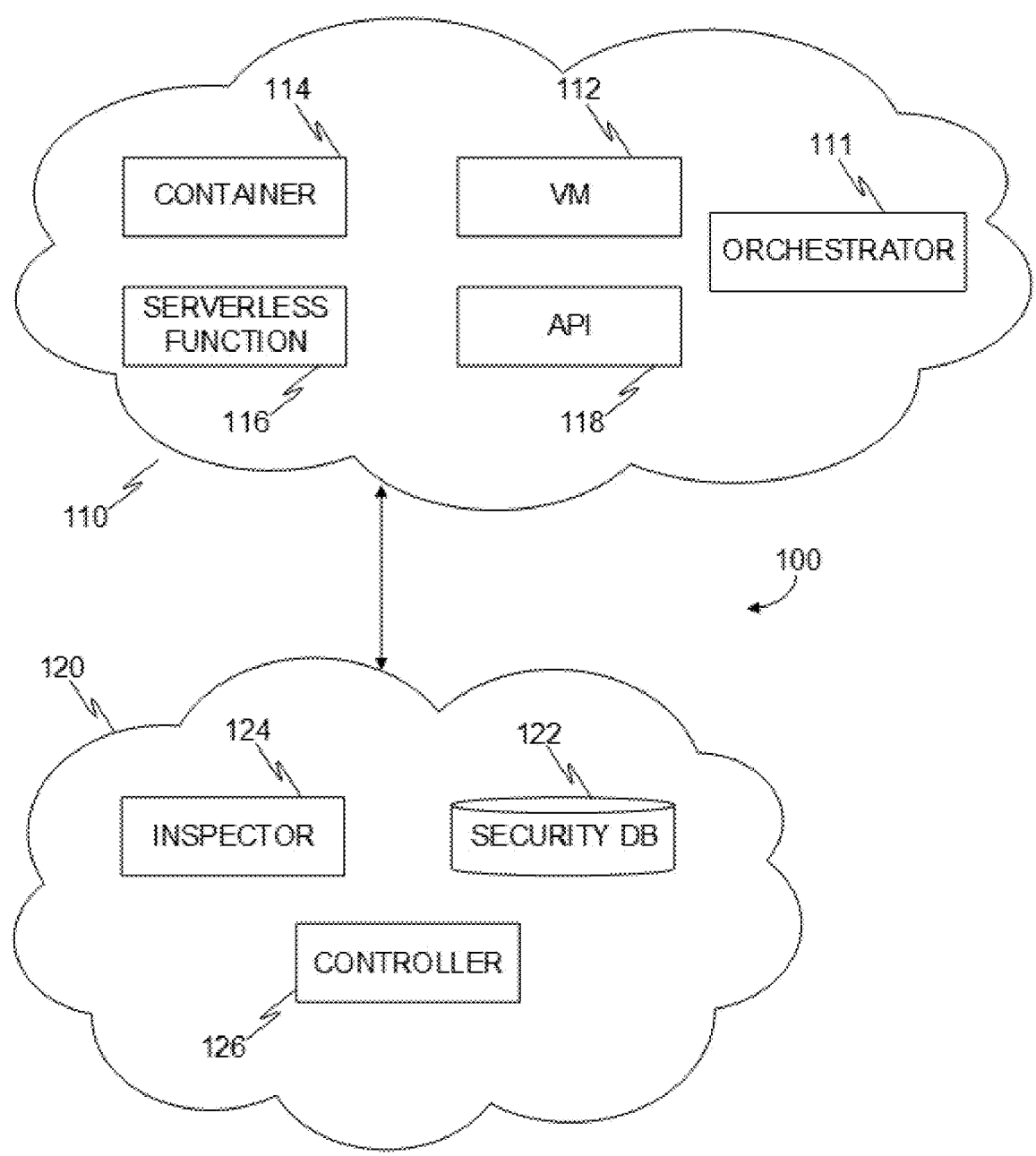
FIG. 1 is a diagram of a cloud computing infrastructure, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting cybersecurity risks in a cloud computing environment by inspecting a disk (original disk) or a live virtual instance deployed in a production environment of a cloud computing environment. The production environment is a cloud computing environment which provides services, resources, and the like, to users of the production environment. The original disk is cloned into a cloned disk, which includes generating a cloned disk descriptor. The original disk is a virtual disk, which is assigned physical storage by using a disk descriptor. The disk descriptor is a data structure which includes a reference, such as a pointer, to an address of a physical storage of a shared storage scheme in the cloud computing environment. When generated, the cloned disk descriptor contains a pointer which points to the address of the physical storage of the original disk. The cloned disk may then be inspected, while the live virtual instance remains unperturbed. Cloud computing resource usage is reduced, due at least to not having to generate a snapshot of the disk, which would then be mounted and inspected.

Further, no copy is generated and therefore data is not physically duplicated, which would require additional storage resources if performed.

FIG. 1 is an example of a diagram of a cloud computing infrastructure 100, implemented in accordance with an embodiment. A cloud computing infrastructure 100 may be, for example, Amazon® Web Services (AWS), Google® Cloud Platform (GCP), Microsoft® Azure, Oracle® Cloud Infrastructure (OCI), and the like. In an embodiment, a plurality of cloud computing infrastructures may be utilized, each having at least one cloud computing environment deployed thereon. A cloud computing environment 110 is deployed on the cloud computing infrastructure 100. A cloud computing environment 110 may be, for example, a virtual private cloud (VPC) deployed on Azure.

The cloud computing environment 110 includes cloud entities, such as resources and principals. A resource is a cloud entity which supplies functionality, such as processing power, memory, storage, communication, and the like. A resource may supply more than one functionality. Resources may include, for example, virtual machines (VMs), such as VM 112, container engines such as container engines 114, serverless functions such as serverless functions 116, and the like. As used herein, unless otherwise noted, the terms 'resource', 'virtual instance' and 'workload' are used interchangeably. The cloud computing environment 110 may further include an application programming interface (API), through which actions in the cloud environment may be triggered. A container engine may be implemented using Kubernetes® or Docker®. A serverless function may be implemented using Lambda®. A VM may be implemented using Oracle® VirtualBox, Azure Virtual Machines, and the like.

In an embodiment, an Azure VM is deployed with an operating system (OS) disk, a temporary disk, and at least one data disk. It should be noted a VM may be deployed with only an OS disk, in some embodiments. The at least one data disk is a managed disk which is attached to the VM and used to store, for example, application data, generated content, and the like. The OS disk includes a preinstalled OS and contains a boot volume. The temporary disk is an optional disk which is not managed, and is used for short-term storage, e.g., for storing a page file, a swap file, and the like. An example of a VM 112 is discussed in more detail in FIGS. 2A and 2B below.

A principal is a cloud entity which acts on a resource, meaning it can request, or otherwise initiate, actions or operations in the cloud environment which cause a resource to perform a function. A principal may be, for example, a user account, a service account, a role, and the like. In an embodiment a principal is implemented as a data structure which includes information about an entity, such as username, a password hash, an associated role, and the like.

The cloud computing environment 110 is connected with an inspection environment 120. The inspection environment 120 is a cloud computing environment. In an embodiment, the inspection environment 120 is deployed on the cloud computing infrastructure 100, in another cloud computing infrastructure, or a combination thereof. In certain embodiments a portion of the inspection environment 120 is deployed in the cloud computing environment 110. In some embodiments, certain instances deployed in the inspection environment 120 may be deployed in the cloud computing environment 110.

The inspection environment 120 includes a plurality of inspector workloads, such as inspector 124. The inspector 124 is configured to inspect workloads (i.e., virtual instances) of the cloud computing environment 110. In certain embodiments, an inspector, such as inspector 124, may be configured to inspect other cloud entities, such as user accounts, and the like. In an embodiment, a storage, such as a disk of a virtual machine, may be cloned. As will be discussed below, the cloned disk may be accessed by the inspector 124. The inspector 124 may inspect the cloned disk of the workload for security objects, such as secrets, keys, user account information, and the like. In some embodiments, the inspector 124 inspects the cloned workload for applications, operating systems, binaries, libraries, and the like.

In an embodiment, a cloned disk, which may be a clone of, for example, a data disk, an OS disk, and so on, is generated by generating an instruction, which when executed by the cloud computing environment (e.g., by an orchestrator 111 of the cloud computing environment) generates a disk descriptor, based on a virtual instance descriptor (e.g., a VM descriptor). In a cloud computing environment, an orchestrator 111 is an application which configures, coordinates, and manages applications, deployments, and the like. The virtual instance descriptor includes an address where content of the disk is stored. The address may be, for example, an address of a page in a shared storage scheme. The disk descriptor is a data structure which includes therein a data field which includes the original address from the virtual instance descriptor.

A cloned disk is instantly available for inspection, as generating the disk descriptor is an instant operation. In contrast, generating a snapshot requires copying of data, which is only available for inspection once the snapshot generation is complete. Therefore, disk cloning provides faster access to a disk for inspection, and additionally requires less computing resources for such inspection. This is advantageous as the cloning does not disturb a live virtual instance (i.e., a virtual instance deployed in a production environment) while allowing access to a data disk thereof, without requiring cloud resources other than a generation of a cloned disk descriptor. The inspection of a cloned disk is discussed in further detail below.

The inspection environment 120 further includes a security database 122, which is a graph database. A security graph may be stored on the security database 122. The security graph includes a representation of the cloud computing environment 110. For example, cloud entities of the cloud computing environment 110 may be represented each as nodes in the security graph. In an embodiment the security graph is generated based on objects detected by an inspector, such as inspector 124. In an embodiment, a virtual instance (e.g., a virtual machine) is represented by a node stored in the security graph. A disk, such as OS disk, data disk, and the like, are also represented each by a node, which is connected to the node representing the virtual instance. In certain embodiments, generating an instruction to inspect a virtual instance further includes querying a security graph to determine an identifier of a disk which is connected to the virtual instance, by generating a query to detect a node representing a disk which is connected to another node representing the virtual instance.

A controller 126 is further included in the inspection environment 120. In an embodiment the controller 126 is a workload deployed in the inspection environment 120 which is configured to initiate inspection of the cloud computing environment 110. For example, initiating inspection may include determining what cloud entities to inspect, when to inspect them, and the like.

Figure 2:
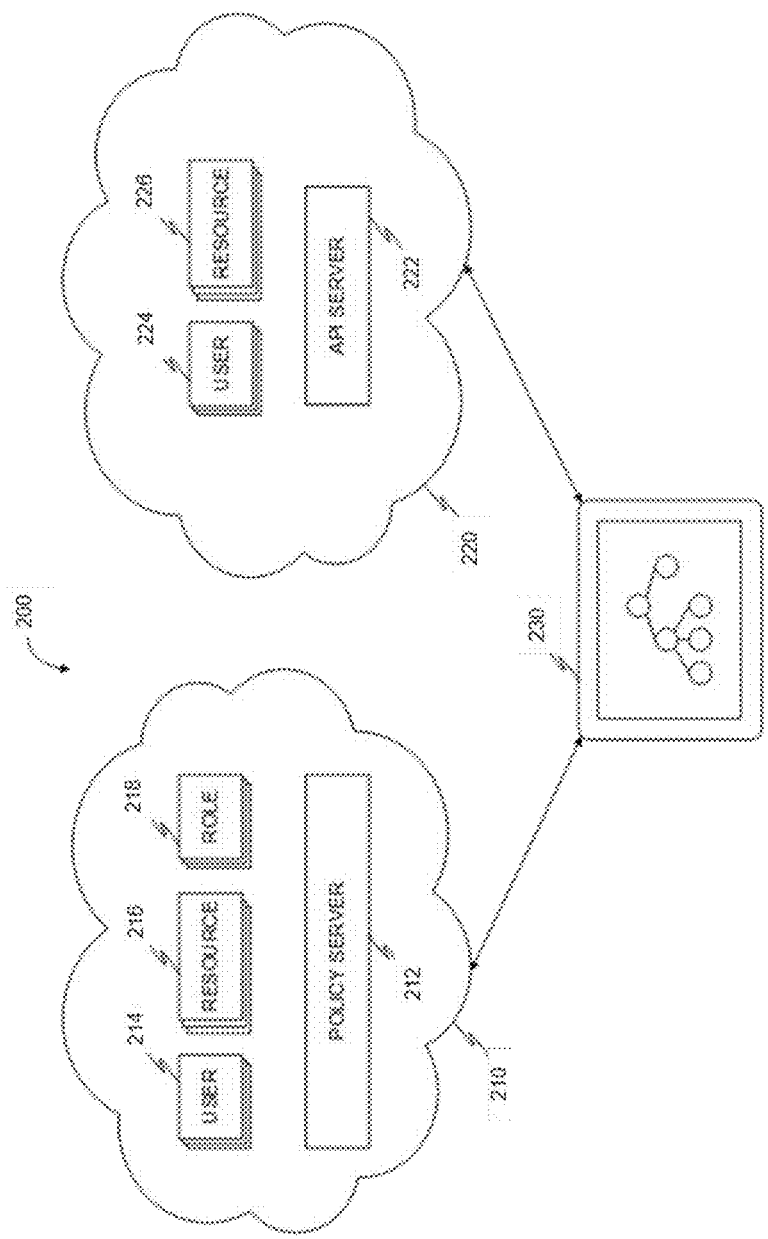
FIG. 2 is a schematic illustration of multiple cloud-based computing environments communicatively connected to a unifying identity mapper, implemented in accordance with an embodiment.

FIG. 2 is a schematic illustration 200 of multiple cloud computing environments communicatively connected to a unifying identity mapper, implemented in accordance with an embodiment. Cloud computing environments may each operate with one or more standards (i.e., models), and achieve similar or different functionality in different or similar manners. An organization of users may use a first type of cloud environment for a first purpose, where it is advantageous, and a second type of cloud environment for a second purpose, where the second environment is likewise advantageous. Amazon® Web Services (AWS), Google® Cloud Platform (GCP) and Microsoft® Azure are all examples of cloud computing infrastructures. Within such an infrastructure, an organization may have their own cloud environment, for example implemented as a virtual private cloud (VPC). For example, an organization may use AWS as a first cloud environment, and GCP as a second cloud environment. GCP may define a service account as having a first set of attributes, while AWS may define a service account as a user account having a second set of attributes, where at least a portion of the attributes of the first and second sets overlap.

However, utilizing different cloud environments may lead to complicated security policies, which in turn can present vulnerabilities for an organization. In order to at least minimize these risks, it would be beneficial to have a single normalized model for all cloud environments. Such a single normalized model would allow to identify where potential threats and risks are.

Generally, every cloud computing environment includes principals, which act on resources. A principal is a cloud entity which can generate a request for an action or operation to occur in the cloud environment, where the action or operation involves a resource. In an embodiment a principal may be implemented as a cloud entity having an identifier (e.g., email address) associated with a set of permissions. A permission may allow the principal to generate service requests in the cloud environment. A principal may be a user account, service account, role, and the like, while a resource may be a virtual machine, container, serverless function, and the like. Each cloud environment may include different definitions and structures for what constitutes a principal or a resource. For example, in some cloud computing environments code may execute as a user account rather than a service account, while in others code can only execute as a service account.

As demonstrated in FIG. 2, a first type of cloud-based computing environment (hereinafter "cloud environment") 210 includes a plurality of user accounts 214, a plurality of resources 216, and a plurality of roles 218. A role 218 is a set of one or more permissions which may be associated with one or more user accounts 214. A user account 214 may be associated with a plurality of roles. The cloud environment 210 further includes a policy server, which includes one or more security policies, Each security policy (or simply policy) includes one or more permissions which allow a user account 214, a role 218 or both, access to a resource 216. A policy may be, for example, a JSON file including therein text which indicates what certain permissions are. A policy may include wildcards, allowing, for example, every user account having an email address at a first domain access to a first resource, and user accounts having an email address at a second domain access to the first resource and to a second resource. For example, the first type of cloud environment may be an AWS type cloud environment.

A second type of cloud environment 220 includes a plurality of user accounts 224, a plurality of resources 226, and an API server 222. The API server 222 may provide upon request data including user accounts, applications, resources, and relationships (i.e., permissions) between them. For example, the second type of cloud environment may be a GCP type cloud environment.

Each of the cloud environments 210 and 220 are connected to a unifying identity mapper 230 over a network (not shown). A cloud environment may be, for example, Amazon® Web Services (AWS), Google® Cloud Platform, Microsoft® Azure, and the like. The first and second cloud environments 210, 220 may be the same type of cloud environment, or different types of cloud environments. For example, a first cloud environment may be spun up in AWS, while the second cloud environment is spun up in Azure. As another example, the first and second cloud environments 210, 220 may be both spun up in AWS, as separate environments under the same cloud computing architecture, e.g. utilizing a first VPC for the first cloud environment 210 and a second VPC for the second cloud environment 220.

In some embodiments, the unifying identity mapper ("mapper 230") may reside in the first cloud environment 210, the second cloud environment 220, or a different networked or cloud computing environment. The mapper 230 is configured to receive from each cloud environment data pertaining to cloud entities, such as users, resources, roles, policies, permissions, and the like. Receiving such data may be different based on the cloud environment architecture. For example, Google® Cloud Platform provides such information by accessing an API, which may be queried to receive text based policies, a list of user accounts, a list of service accounts, a combination thereof, and the like.

In an embodiment, the mapper 230 is configured to call the API with a request to receive the data. As another example, AWS provides policies which may be requested as JSON files. The mapper 230 is further configured to read the data from, for example, the JSON file and map the read (or received) data into a unified model of a security graph. Mapping the received data may include generating nodes in a security graph representing principals and resources, and connecting the nodes based on permissions which are read from the received data. This is discussed in more detail in FIG. 9 herein. The security graph may be stored in a graph database 235. A graph database may be, for example, Neo4j®. The mapper 230 may be implemented as a physical machine, a virtual machine, a node of a container, and the like. An embodiment of a mapper 230 is discussed in more detail in FIG. 7 below.

Figure 3:
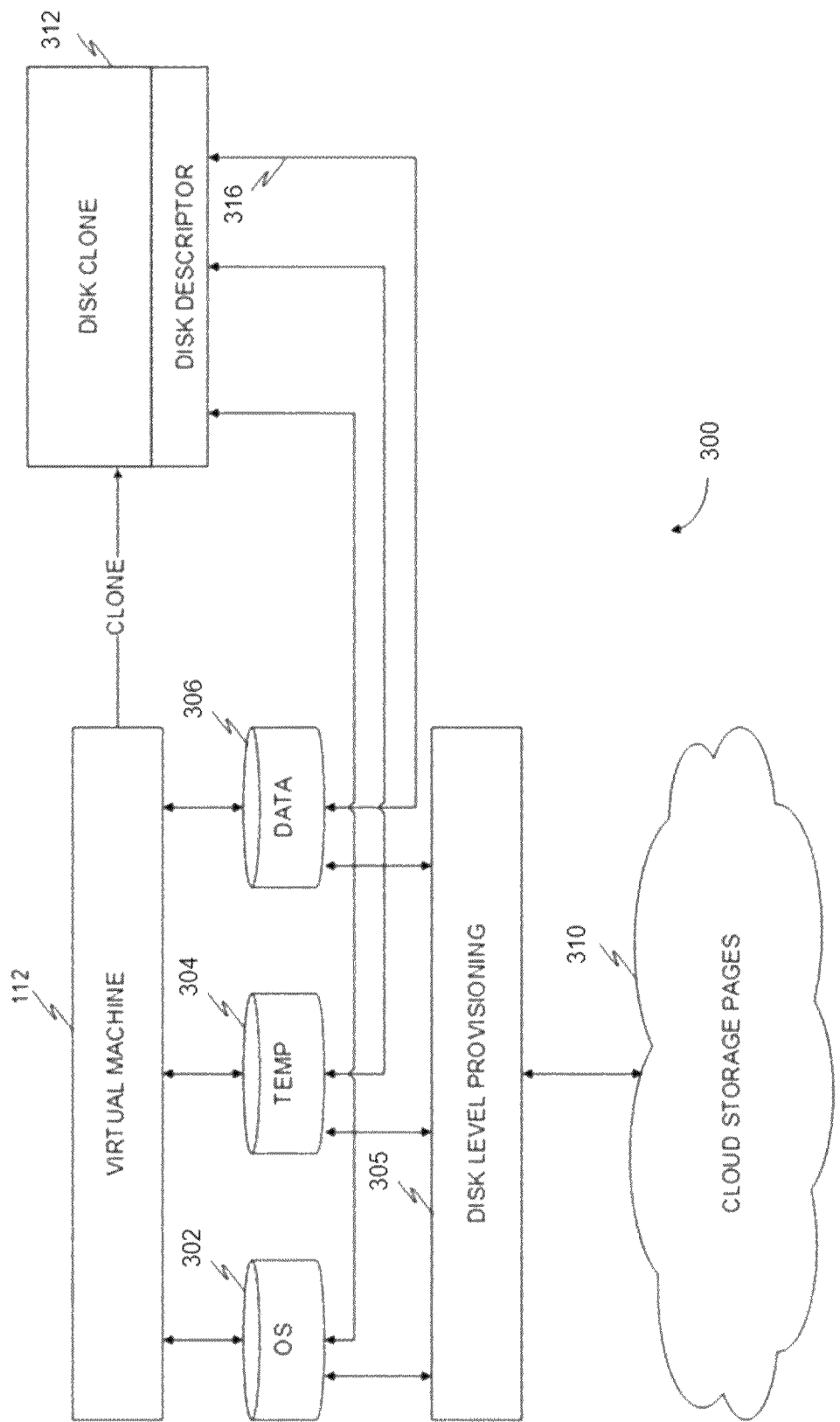
FIG. 3 is a diagram of a virtual machine and a cloned disk thereof, utilized to describe an embodiment.

FIG. 3 is an example diagram 300 of a virtual machine 112 and a cloned disk thereof, utilized to describe an embodiment. While an Azure® cloud computing infrastructure is discussed here, it should be understood that the teachings herein apply equally to other cloud computing infrastructures which offer equal functionality. The VM 112 includes a plurality of disks allocated to the VM 112. The VM 112 may be deployed only with an OS disk, with an OS disk and a plurality of data disks, and so on.

In this example embodiment the plurality of disks includes an operating system (OS) disk 302, an optional temporary disk 304, and at least a data disk 306. The OS disk 302 includes a preinstalled OS, such as Microsoft® Windows, or Linux®. The preinstalled OS is in a boot volume of the OS disk 302. The optional temporary disk 304 may be used for storing temporary data, such as page files, swap files, and the like. The data disk 306 may be used for storing an application, application code, libraries, binaries, application data, and the like. In an embodiment, a plurality of data disks 306 may be allocated to the VM 112. In some configurations, a disk of the plurality of disks may be encrypted. For example, the OS disk 302, and the data disk 306 may be encrypted disks. In certain embodiments an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 112 by a disk level provisioning 305. In an embodiment, the disk level provisioning 305 is an application deployed in a cloud computing infrastructure. The disk level provisioning 305 provisions hardware resource to the VM 112 which results in allocation of a disk. The hardware resources are provisioned from cloud storage pages 310 of the cloud computing infrastructure. The hardware resources may be solid state device (SSD) storage, hard disk drive (HDD) storage, optical storage, other magnetic storage, and the like. In an example embodiment, the cloud storage pages 310 are Azure page blobs. A page blob is a collection of a pages, each page having a predetermined size. For example, the predetermined size may be 512-bytes per page.

A disk clone 312 (also referred to as cloned disk 312) includes a disk descriptor which includes a reference to an address of a disk of the VM 112. In certain cloud computing infrastructures, when a disk is cloned, a pointer, such as pointer 316 is used to point to an original disk, in this example the data disk 306. In an embodiment, this may be achieved by dereferencing a pointer of the VM 112 which points to the data disk 306, and generating the pointer 316 for the cloned VM 312 to point to the data disk 306. In certain embodiments where a disk is encrypted, a pointer may be generated for the cloned VM 312 to the encryption key.

In an embodiment, the cloning process generates the disk clone 312 as a background process. This is possible due to utilizing diffs. A diff is an additional content that includes the difference between a content at one point in time (e.g., when the original disk was cloned) and a second, later, point in time. Thus, the VM 112 may access the data disk 306 and any diffs generated, or committed, after the disk clone 312 is generated, whereas the disk clone 312 may access only the content of the original data disk 306, and cannot access any diffs generated since.

The cloned disk 312 may then be inspected by an inspector, such as the inspector 124 of the inspection environment 120 of FIG. 1 above. In some embodiments, a cloud computing infrastructure may be divided into regions, corresponding to geographic regions. In such embodiments, cloning a disk may be possible only if the disk clone is in the same region as the original disk from which the clone is generated. In an embodiment an inspection controller, such as the controller 126 of FIG. 1, may determine if inspecting a virtual instance requires generating a disk clone or a snapshot. In an embodiment, the determination is performed based on the geographic location of the VM 112, an intended geographic location into which a disk of the VM 112 is cloned, a geographic location of the inspection environment, a number of disks allocated to the virtual instance, or any combination thereof.

By inspecting a cloned disk 312 there is no need to generate a snapshot, which prevents at least some of the deficiencies noted above. Furthermore, cloning is performed on a live virtual instance, which remains live during inspection, as the cloning does not interfere with the virtual instance's operation. Once inspection of the cloned disk 312 is complete, the cloned disk 312 may be spun down, releasing any resources allocated to it, and removing the pointers pointing to the disks of the virtual machine. In an embodiment, the cloned disk 312 may be deleted to accomplish spinning down.

Figure 4:
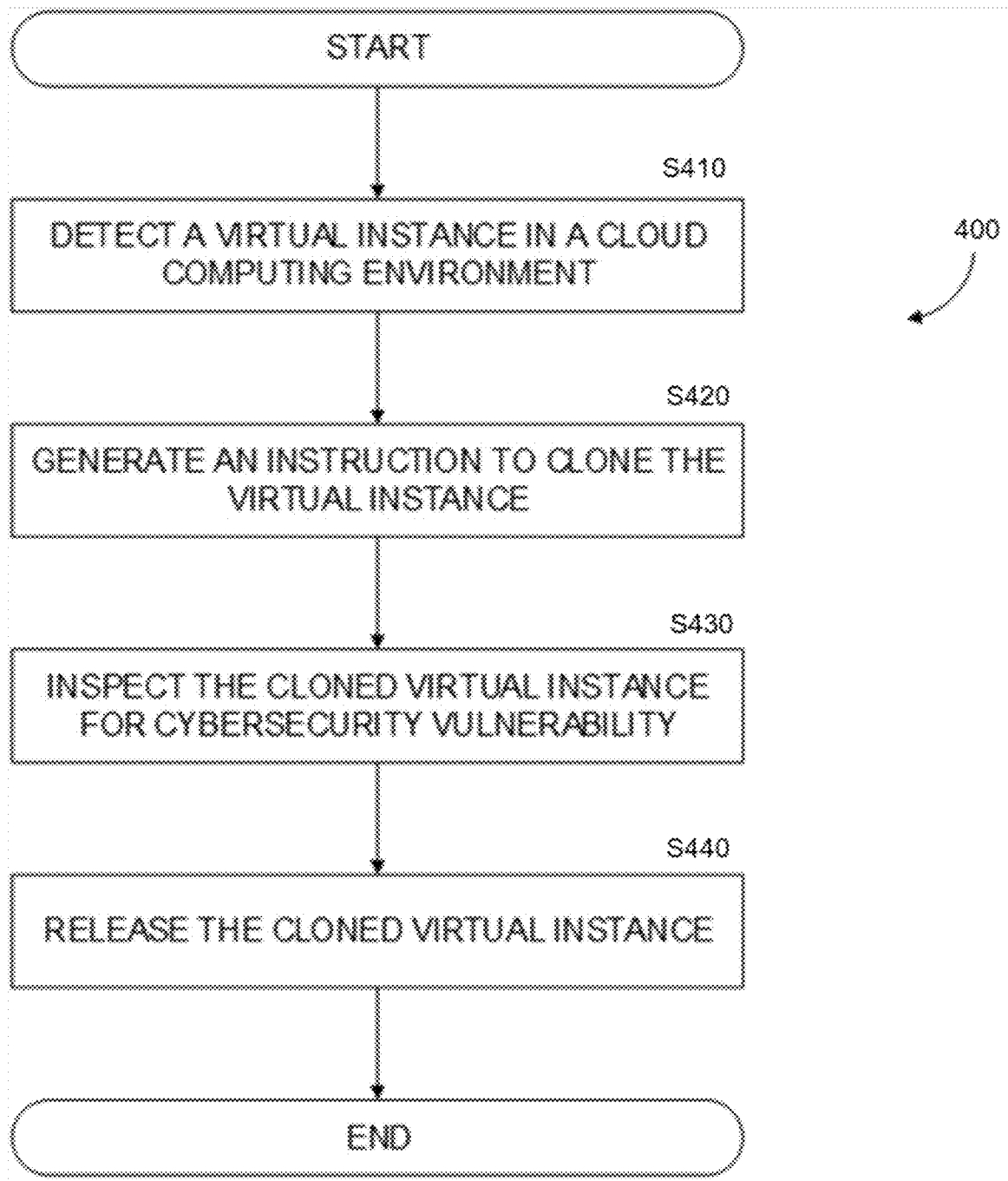
FIG. 4 is a flowchart of a method for generating a disk clone of a virtual instance for vulnerability inspection according to an embodiment.

FIG. 4 is an example flowchart 400 of a method for generating a disk clone of a virtual instance for vulnerability inspection according to an embodiment.

At S410, a live virtual instance is detected in a cloud computing environment. A live virtual instance is a virtual instance which, at the time of detection, is deployed in a production environment. A production environment is a cloud computing environment which provides services and resources, for example, to users of the cloud computing environment. This is an environment which is distinct, for example, from a test environment in which applications, appliances, code, and the like, are tested, before being deployed in a production environment for general use.

In an embodiment, an application programming interface (API) of a cloud computing environment may be queried to detect virtual instances deployed therein. In other embodiments, a security graph may be queried to detect virtual instances deployed in the cloud computing environments. The security graph, which includes a representation of the cloud computing environment, may be queried to detect virtual instances based on at least an attribute. The at least an attribute may be, for example, a type of virtual instance (e.g., virtual machine, container, etc.), a region in which the virtual instance is deployed, a tag indicating that the virtual instance should be inspected, and the like.

In an embodiment, detecting a virtual instance further includes determining an identifier of the virtual instance, such as a name, network address, and the like. The identifier may be used to access the virtual instance. The virtual instance includes a disk (also referred to as original disk). In some embodiments, the disk is represented as a node in the security graph, the node connected to another node, the another node representing the virtual instance.

In certain embodiments, detecting a live virtual instance includes receiving an identifier of the live virtual instance, and an instruction to inspect the live virtual instance.

At S420, an instruction is generated which, when executed, configures the cloud computing environment to clone the disk of the virtual instance. In an embodiment, the instruction is generated for execution by an orchestrator of the cloud computing environment in which the virtual instance, also called a parent virtual instance, is deployed. When executed, the instruction configures, for example, the cloud computing environment, to allocate resources to a cloned disk. The cloned disk is an independent copy of the original disk of the parent virtual instance. An independent copy of a disk is a copy which can be deployed and accessed independently of the original disk. This is as opposed to a copy of a virtual instance, such as a snapshot, which requires additional resources allocated in order to deploy.

For example, a snapshot may be generated based off of a single disk of a virtual instance. A new disk (e.g., persistent volume) may be generated based off of the snapshot, and a claim (e.g., persistent volume claim) generated to another virtual instance in order to access data stored on the new disk. Furthermore, a snapshot is only available once the disk is completely copied. In contrast, a clone is available immediately as the operation of generating a disk descriptor is faster than an operation of generating a snapshot. For at least this reason inspection is completed faster.

In certain embodiments, the instruction, when executed, configures the cloud computing environment to generate a cloned disk having a reference, such as a pointer, to the original disk of the parent virtual instance. In some embodiments, the disk is encrypted with an encryption key. The encryption key, as well as the disk, may be dereferenced. Dereferencing an encryption key (or a disk) may include determining where a pointer of the parent virtual instance is pointing to, e.g., the pointer points to a block address of a managed block storage. A new pointer may be stored for the cloned disk which points to the same block address, encryption key, etc. as the dereferenced pointer.

In some embodiments, an optional check is performed to determine if the cloned disk is configured to be deployed in a same region as the parent virtual instance. A cloud computing infrastructure may limit the ability to clone a disk outside of a region. For example, if an inspection environment is not in the same region as the cloud computing environment in which the virtual instance is inspected, it may not be possible (i.e., not permissible) to generate a disk clone in the region where the inspection environment is.

In other embodiments, an optional check may be performed to determine the number of disks associated with a virtual instance. For example, if the number of disks equals or exceeds a predetermined threshold the cloning process may be initiated, otherwise a snapshot is generated, and inspection is performed on the generated snapshot.

At S430, the cloned disk is inspected for cybersecurity threats. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like, which are indicated by cybersecurity objects.

Inspecting a cloned disk includes, in an embodiment, assigning an inspector to the cloned disk. In some embodiments, an inspector, such as inspector 124 of FIG. 1, is provided with access to the cloned disk. For example, the cloning process may include generating an instruction which when executed configures the cloned disk to allow an inspector workload access thereto. The inspector may inspect the cloned disk for security objects, such as files, folders, and the like. A security object may be, for example, a password stored in plaintext, a password stored in cleartext, a certificate, and the like.

For example, in an embodiment, a signature for a file, folder, and the like is generated during an inspection. Such a signature is matched to another known signature. The known signature indicates a vulnerability. A signature may be generated, for example, using a checksum.

At S440, the cloned disk is released. In an embodiment, an instruction may be generated which, when executed, configures the cloud computing environment to release the cloned disk. Releasing a cloned disk may include, for example, deprovisioning resources allocated to the cloned disk. For example, a cloned disk may be deleted. Releasing the cloned disk is performed in response to completing the inspection.

While virtual machines are discussed throughout this disclosure, it should be understood that the teachings herein apply equally to other virtual instances with respect to cloning and snapshot generation.

Figure 5:
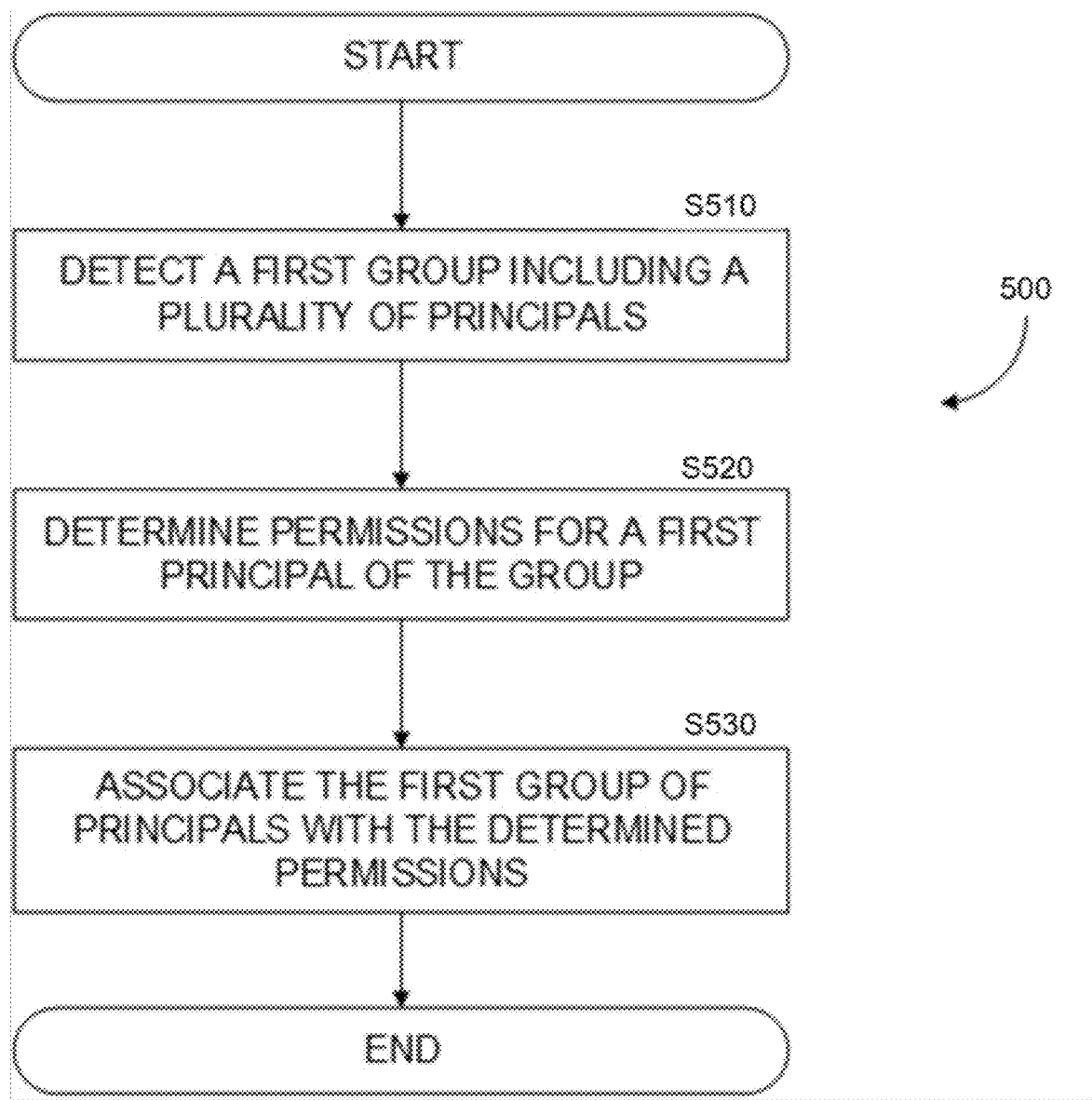
FIG. 5 is a flowchart of a method for determining effective permissions of a principal in a cloud environment, implemented in accordance with an embodiment.

FIG. 5 is an example flowchart 500 of a method for determining effective permissions of a principal in a cloud environment, implemented in accordance with an embodiment. Effective permissions are permissions which a principal has in the cloud environment in which the principal is deployed. The permissions may include a set of actions and operations which the principal can instruct the cloud environment, or one or more resources of the cloud environment, to perform. Determining effective permissions is advantageous from a security perspective as it allows to realistically understand where potential security threats may arise. For example, assuming a certain user has limited permissions, only to discover that the user has permissions which exceed those limitations, is a typical scenario in cybersecurity incidents (e.g., limited third party vendor having administrator permissions).

A naïve approach for determining effective permission would be to determine for each principal represented in the security graph each possible interaction with each resource. However, for typical cloud environments, this can lead to large and complicated calculations, thus requiring large compute and memory resources to accomplish, and in most cases, it is not a feasible solution. An optimization is therefore proposed.

At S510, a first group of a plurality of principals is detected in a security graph. Detecting a group of principals may be performed, for example, by utilizing maximal bicliques. A biclique is a bipartite graph where every node of the first set (principals) is connected to every node of the second set (resources). A biclique is maximal when it is the largest size, based on number of nodes or number of edges. The security graph may be generated for example as detailed in FIG. 3 above. A group of principals may be detected, for example by querying the security graph to detect all users belonging to a certain role, belonging to a certain group, having a specific permission directed at a specific resource (e.g., allowed to write to a first database), and the like.

At S520, one or more permissions are determined for a first principal of the first group. The one or more permissions may be associated with one or more resources. For example, a first permission set (i.e., role) may be associated with a first resource, a second permission set may be associated with a second resource, and so on. In an embodiment, determining the one or more permissions may be performed by querying the security graph to determine what nodes of roles, permissions, policies, and the like, a principal node representing the first principal is connected to.

At S530, the first group of principals is associated with the determined one or more permissions. By associating all the principals based on determining permissions for a single principal, many redundant calculations are spared, thereby reducing compute and memory required for storing the redundant information. For example, a node representing the determined one or more permissions (permission node) may be generated in the security graph. Nodes representing the first group of principals may be connected to the permission node, thereby associating the first group of principals with the permissions. This approach means permissions do not have to be determined for each and every principal, resulting in less processing. Further, by representing permissions as a node, the graph is more compact as less memory is used, since redundant data (i.e., repeating permissions) is not stored.

Figure 6:
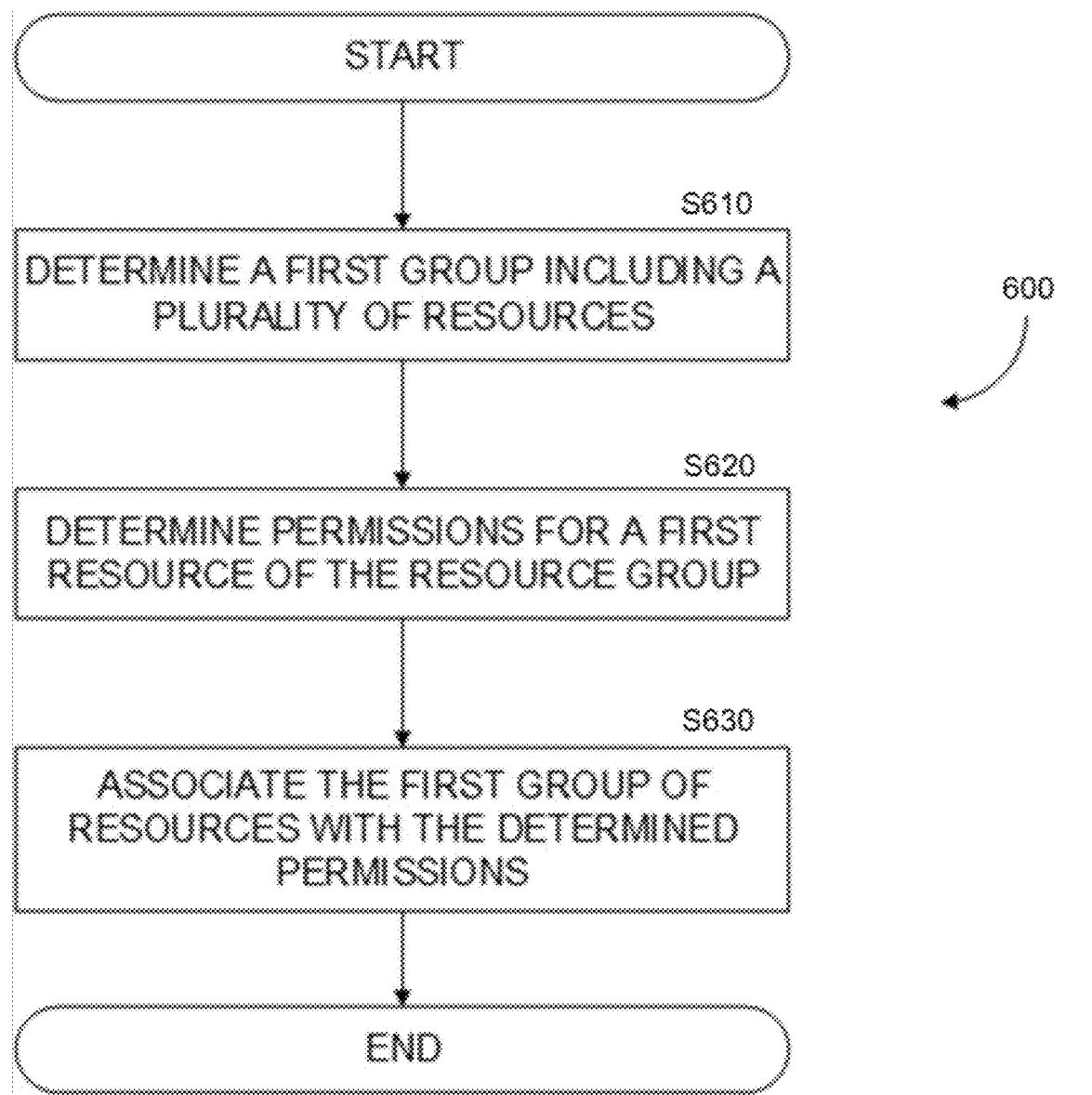
FIG. 6 is a flowchart of a method for determining effective permissions of a resource in a cloud environment, implemented in accordance with an embodiment.

FIG. 6 is an example flowchart 600 of a method for determining effective permissions of a resource in a cloud environment, implemented in accordance with an embodiment. Determining effective permissions is advantageous from a security perspective as it allows to realistically understand where potential security threats may arise. For example, assuming a certain resource may be supposed to have limited permissions, however, the resource can assume a role which would allow the resource additional permissions which were not intended.

As stated above, a naïve approach would be to determine for each resource in the graph each possible interaction with each principal and resource. However, for typical cloud environments, this can lead to a large and complicated calculations, thus requiring large compute and memory resources to accomplish, and in most cases, it is not a feasible solution. An optimization is therefore proposed.

At S610, a first group of a plurality of resources is detected in a security graph. Detecting a group of resources may likewise be performed, for example, by utilizing maximal bicliques. As noted above, a biclique is a bipartite graph where every node of the first set (principals) is connected to every node of the second set (resources). A biclique is maximal when it is the largest size based on number of nodes or number of edges.

At S620, one or more permissions are determined for a first resource of the first group. In an embodiment, a permission is determined for a first resource by performing a search of one or more policies to detect a policy which is applied to the first resource. A policy may include a permission (e.g., ability to write to the resource) and a condition specifying what principal(s) or principal type (e.g., role) may utilize the permission. The one or more permissions may be associated with one or more resources or principals. For example, a first permission set (i.e., role) may be associated with a first resource, a second permission set may be associated with a second resource, and the like.

A permission may be, for example, permission to read data from a storage, and permission to write data to the storage. For example, a first group may have permission to read from the storage, while a second group may have permissions to read and write to the storage. As another example, a user may have permission to write to a first storage of a distributed storage system, which includes multiple storage devices. As the multiple storage devices share a common policy, the user has permission to write to any of the multiple storage devices. By grouping the storage devices, less memory is required to indicate that the user account has permission to write to any of the multiple storage devices.

At S630, the first group of resources is associated with the determined one or more permissions. By associating all the resources based on determining permissions for a single resource, many redundant calculations are spared, thereby reducing compute and memory required for storing the redundant information. For example, the first resource 830A and second resource 840A of FIG. 8A may be associated with permissions based on permissions determined for the first resource 830A. A permission node may be generated in the security graph, and the first resource node 830A and second resource node 840A may be connected to the permission node.

Figure 7:
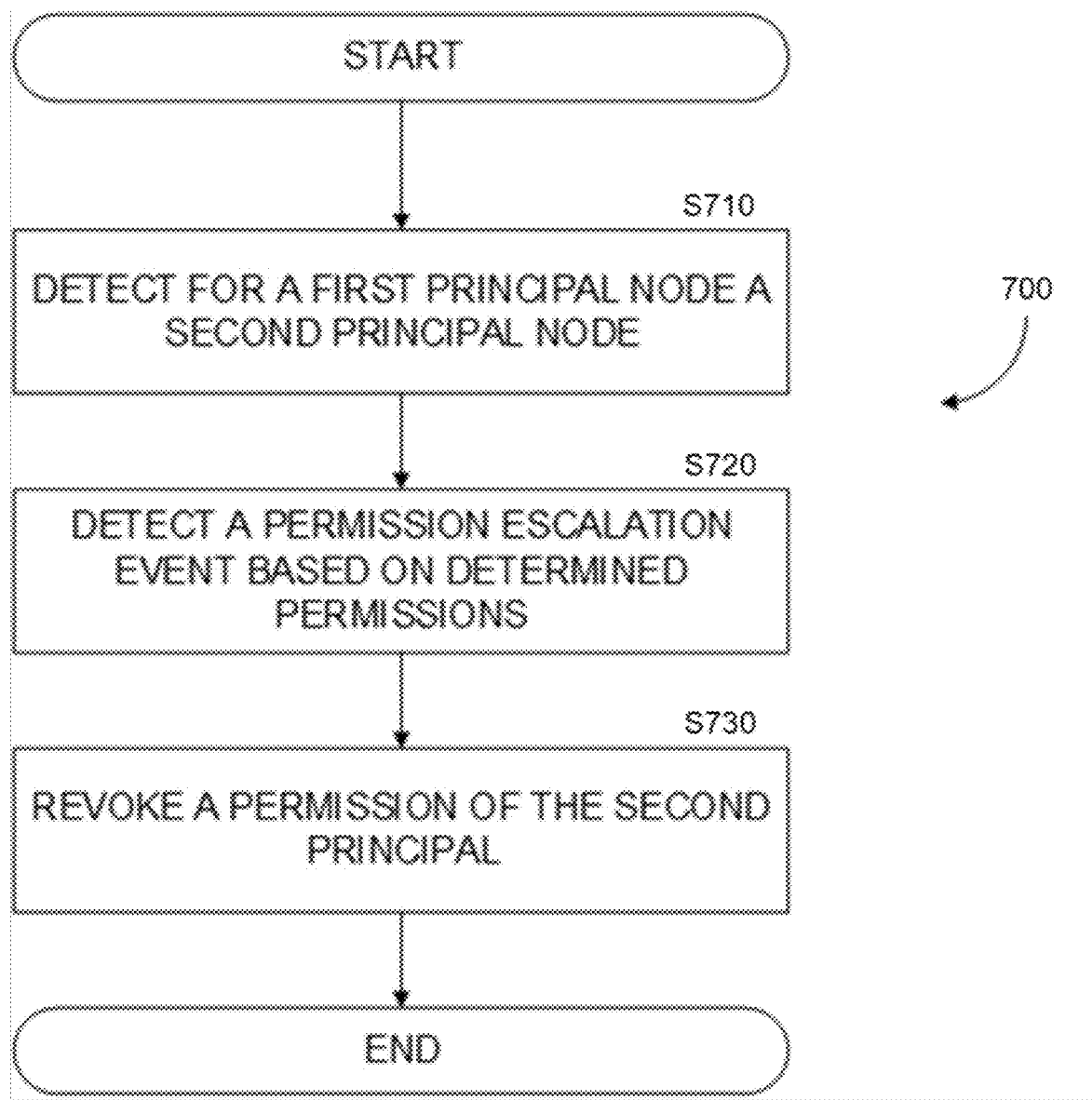
FIG. 7 is a flowchart of a method for detecting permission escalation utilizing a unified identity model implemented in a security graph, implemented in accordance with an embodiment.

FIG. 7 is an example flowchart 700 of a method for detecting permission escalation utilizing a unified identity model implemented in a security graph, implemented in accordance with an embodiment. Permission escalation is a type of security risk where a principal has access to resources which they are not intended to have. A vertical escalation occurs when a principal is able to access resources which are only accessible to principals having higher access. A horizontal escalation occurs when a principal has access to resources of another similar principal (e.g., user A is able to access emails of user B).

At S710, a second principal node is detected for a first principal node. The first principal node is able to assume the second principal node. That is, the first principal node may act as the second principal nodes, in some, or all aspects, meaning the first principal node may request actions or generate instructions which are not permitted to the first principal, but are permitted to the second principal. Permissions of a node may change when acting through another. For example, an application may have permission to perform a wide variety of operations in a cloud environment. However, a user account operating the application may only access limited permissions of all the permissions available to the application.

At S720, a permission escalation event is detected based on determined permissions of the first principal node and the second principal node. In an embodiment, detecting a permission escalation event may occur when an access occurs which involves a principal which is not authorized for the access. This detection is possible by tracing the connection between the access and the principal, utilizing the security graph (e.g., traversing the graph between nodes) as described above.

At S730, upon detection of permission escalation events, one or more permissions associated with the principal may be revoked to prevent the escalation. In another embodiment, a notification may be generated to an administrator account to notify that a potential permission escalation may occur.

Figure 8A:
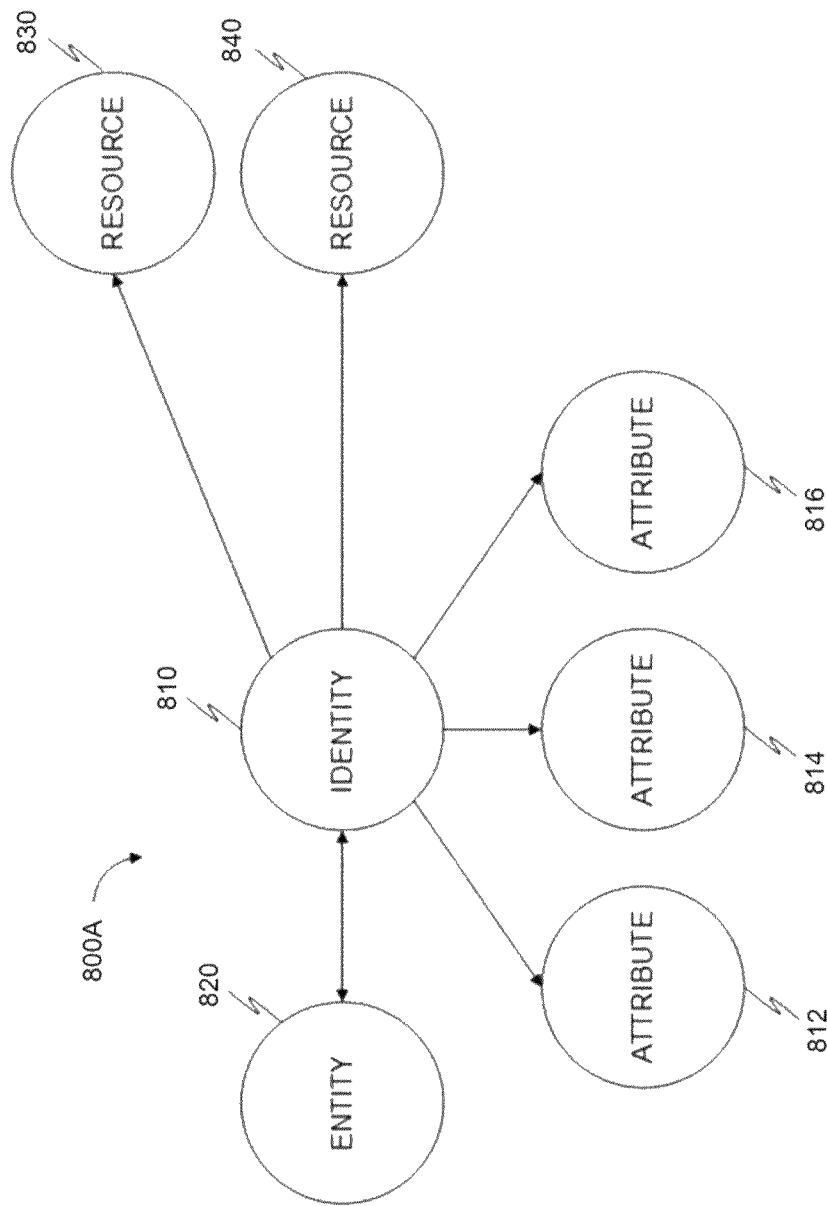
FIG. 8A is a portion of a unified graph model generated by a unifying identity mapper, and implemented in accordance with an embodiment.

FIG. 8A is a portion of a security graph using a unified model 800A generated by the mapper 230 and generated in accordance with an embodiment. An identity is an example of a principal, which acts on resources, such as first resource 830 and second resource 840. In an embodiment, an identity is a set of attributes stored as digital information which represent a principal. An identity 810, such as a username, may be associated with an entity 820. The entity 820 may be a person, organization, application, device, machine, and so on.

Each identity 810 may be connected to a plurality of attributes, such as a first attribute 812, a second attribute 814, and third attribute 816. While three attributes are used in this example, it is readily understood that any number of attributes may define an identity node, and that each identity node may be defined by one or more attributes. An attribute may be metadata. For example, a role may be an attribute of an identity node.

Figure 8B:
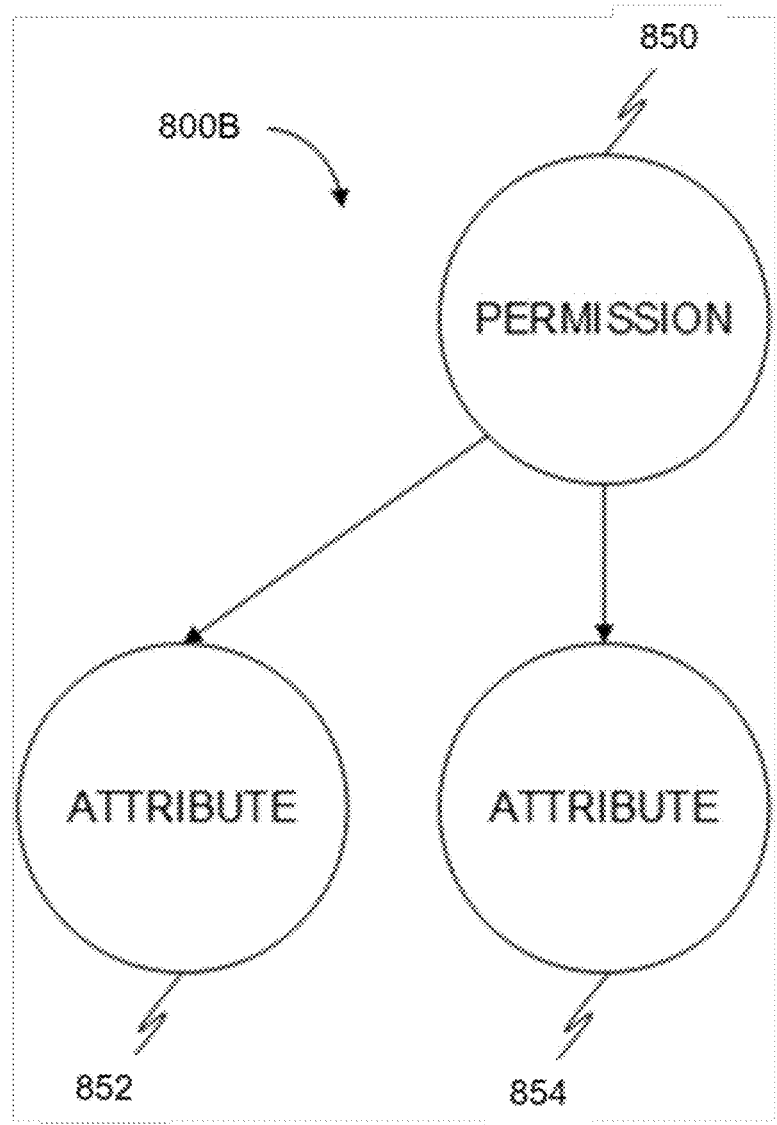
FIG. 8B is another portion of a unified graph model generated by a unifying identity mapper, and implemented in accordance with an embodiment.

FIG. 8B is another portion of a security graph using a unified model 800B generated by the mapper 230 and generated in accordance with an embodiment. A permission node 850 is connected with a first attribute node 852, and a second attribute node 854. While two attributes are used in this example, it is readily understood that any number of attributes may define a permission node 850, and that each permission node may be defined by one or more attributes. An attribute of a permission node 850 may indicate different permission types, such as reading, writing, or erasing files, agents, administrator or root roles, and the like. A permission node 850 may be connected to an identity node, such as the identity node 810 of FIG. 8A.

Figure 9:
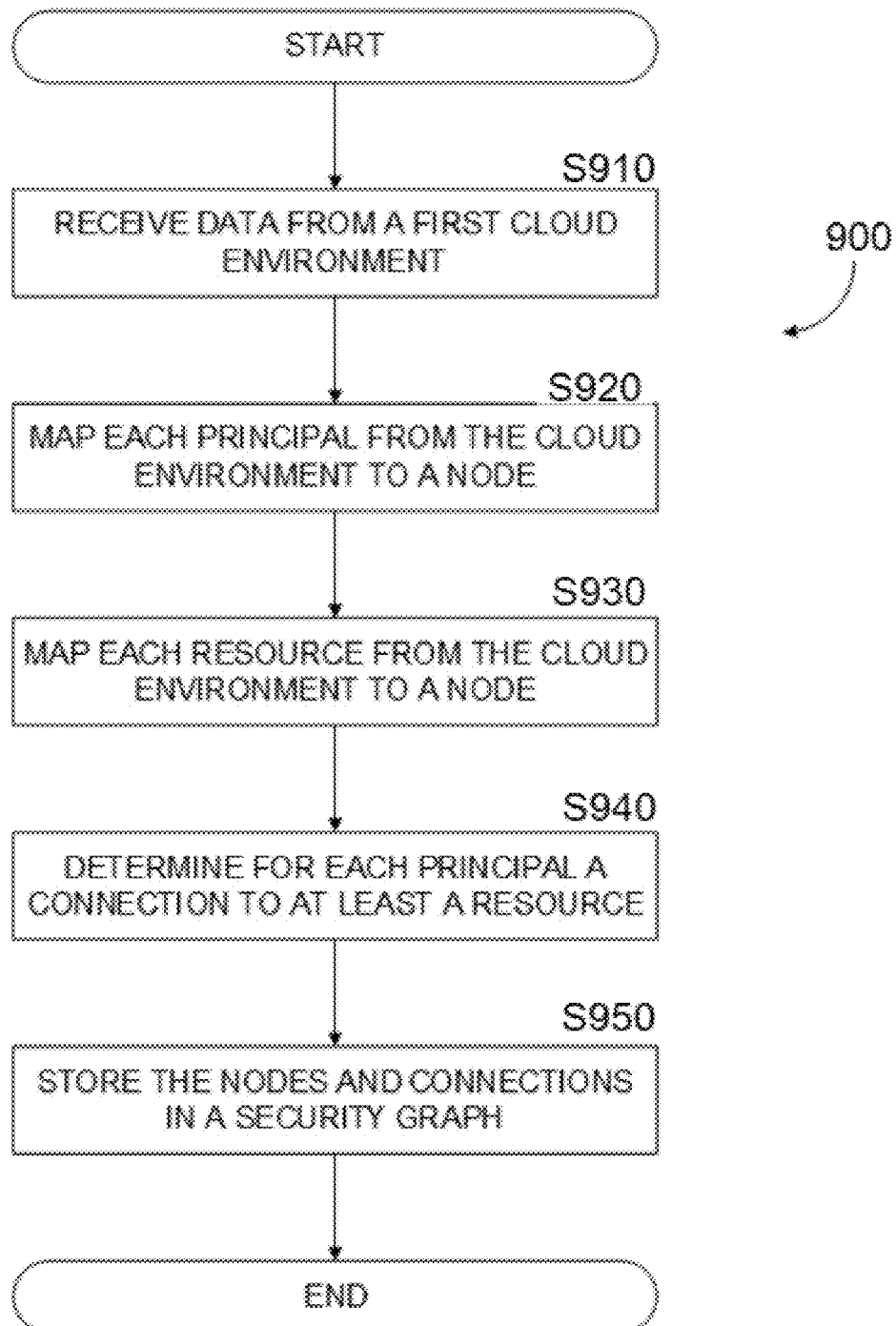
FIG. 9 is a flowchart of a method for mapping principals and resources from a first computing environment to a security graph in accordance with an embodiment.

FIG. 9 is an example flowchart 900 of a method for mapping principals and resources from a first computing environment to a security graph in accordance with an embodiment. In an embodiment the method is performed by the unified identity mapper 230, FIG. 2.

At S910, data is received from at least a first cloud environment. In certain embodiments, data may be received from a plurality of first cloud environments. In some embodiments, data may be further received from a second cloud environment. The second cloud environment may be different from the first cloud environment. For example, the first cloud environment may be an AWS-type cloud environment, while the second cloud environment may be an Azure-type cloud environment. Data may include any information relating to principals, resources, and connections between principals and resources. For example, data may be received by querying an API of a cloud environment to receive user account information, service account information, policies, and the like.

A principal is a cloud entity which can generate a request for an action or operation to occur in the cloud environment, where the action or operation involves a resource. In an embodiment a principal may be implemented as a cloud entity having an identifier (e.g., email address) associated with a set of permissions. A permission may allow the principal to generate service requests in the cloud environment. A principal may be a user account, service account, role, and the like. For example, a role is a set of one or more permissions which may be associated with one or more user accounts. Permissions may be defined, for example, by a policy. A policy may be, for example, a JSON file including therein text which indicates what certain permissions are.

A resource is a cloud entity which includes compute elements, such as storage, memory, parallel processor, linear processor, a combination thereof, and the like. In an embodiment a resource may be, for example, a virtual machine, a container, a serverless function, a bucket, a WAF (Web Application Firewall), a gateway, a proxy server, an application, an appliance, a database, and the like.

At S920, each principal from the first cloud environment is mapped to a corresponding principal node of a security graph using a unified model. In an embodiment, this is performed by generating the principal node in the security graph based on the unified model and associating the principal node with the principal (e.g., associating the principal node with an identifier of the principal). In an embodiment a unified model is a data structure template including a plurality of principal attributes, such that a data structure may be generated for each principal, and at least a portion of the plurality of attributes may have values generated based on attributes of the principal.

A principal node may be, for example, an identity node. For example, a user account is a principal, and the user account is mapped to a principal node representing the user account. The security graph may further store as attributes metadata associated with the user account, such as a username, account type, role, and the like. In an embodiment, a principal from a first cloud environment and a principal from a second cloud environment may be each mapped to a corresponding first and second principal nodes. The first and second principal nodes may be connected to an entity node. This may indicate, for example, that a single entity (e.g., human user) is associated with a user account represented by the first principal node, and a user account represented by the second principal node. Connecting the first and second principal nodes to the entity node may be based on performing a match between attribute values. An attribute may be, for example, a username, email address, role (e.g., admin, root, etc.), and the like. A resource such as a serverless function, is mapped to a resource node representing the serverless function. The security graph may further store for the resource node metadata such as IP address, name, etc.

At S930, each resource from the first cloud environment is mapped to a corresponding resource node of the unified model of the security graph. In an embodiment, this is performed by generating the resource node and associating it with the resource (e.g., associating the resource node with a unique identifier of the resource). The generated nodes may include information which points to the identity/resource to which they are mapped, thereby enabling a trace between the representation (e.g., principal node) and the represented object (specific username). In some embodiments, an entity in a cloud environment may be a principal, and also a resource to other principals. For example, a load balancer may be a resource for a user account, but a principal for a web server which utilizes the load balancer.

At S940 a connection is determined for each principal node to at least another node. The at least another node may be a resource node, or another principal node, such as a role node. A role node is associated with a specific role (i.e., set of one or more permissions relating to a resource). In an embodiment, the connection to a principal node is determined based on a permission allowed to the principal node. In an embodiment, determining a connection may include reading data from a security policy in order to determine if a permission exists to allow communication between the principal node and another principal node, a resource node, a combination thereof, and the like.

At S950 the nodes and connections are stored in the security graph. Storing the nodes and connections (also referred to as edges) in the security graph may include generating in the security graph a data structure based on a template of a unified model, and updating a graph database containing therein the security graph based on the generated data structure. A template may include data attributes. In an embodiment, the unified model includes a plurality of templates, each template corresponding to a cloud entity.

A unified model is useful, for example, for normalizing different cloud infrastructures, which may represent principals, resources, and the like in different ways. For example, a user account may be implemented utilizing different technology stacks in AWS or GCP, especially when taking into account associating permissions, roles, policies, and the like, with a user account. By representing all user accounts using a unified data structure in a security graph, a user querying the graph can get visibility into an organization's entire technology stack, regardless of what cloud infrastructures are used to implement it. Additionally, the methods disclosed herein provide for populating this unified model from multiple cloud environments in an efficient manner in terms of computation (i.e., processor) use, memory use, and storage use. Another advantage of storing a representation of multiple cloud environments using a unified model according to the teachings herein is in allowing to store a single representation (i.e., single graph for all cloud environments) rather than store multiple representations in multiple different systems. Therefore, memory and storage are utilized in a more efficient manner.

Figure 10:
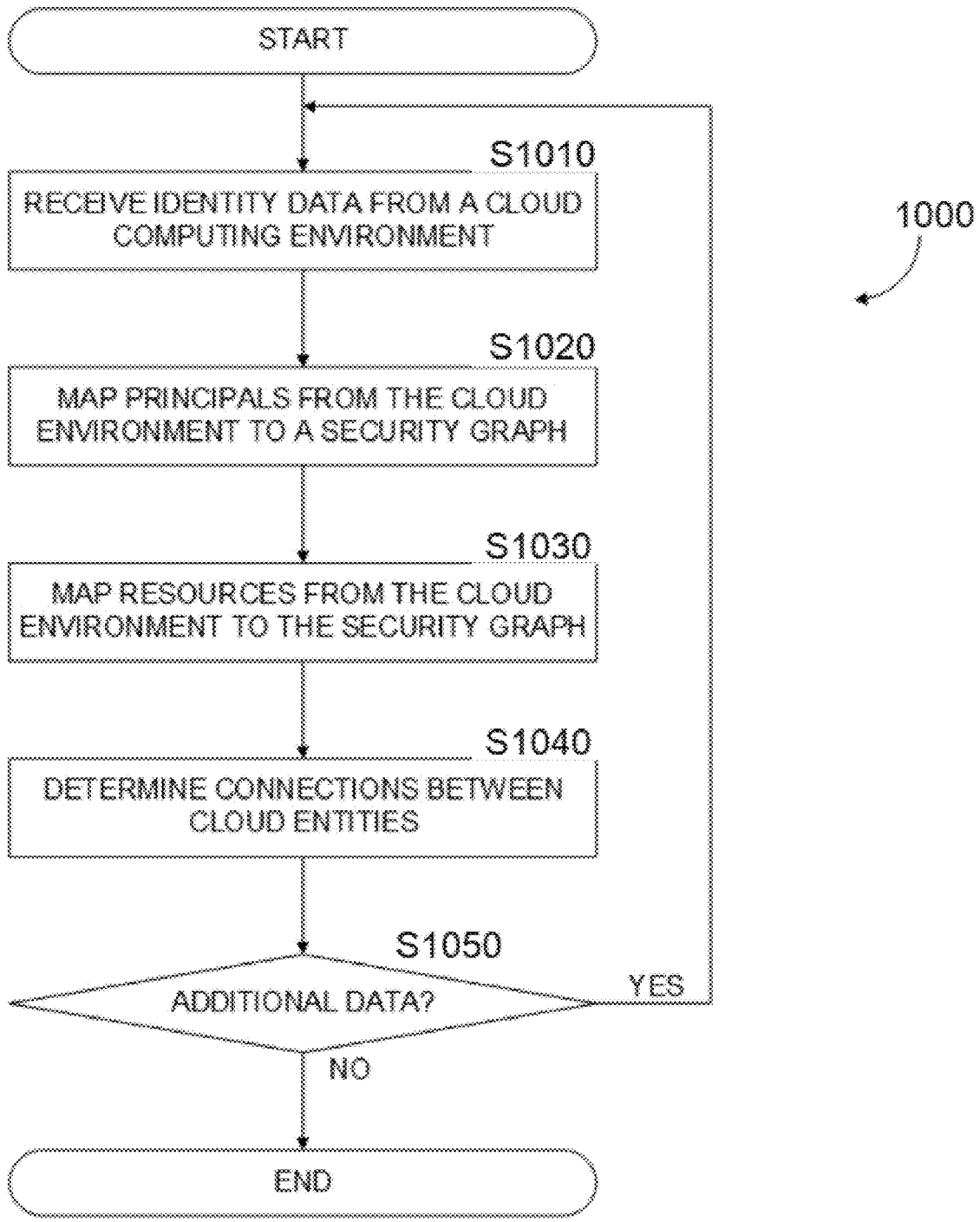
FIG. 10 is a flowchart of a method for mapping principals and resources from a first computing environment utilizing a unified identity mapper, implemented in accordance with an embodiment.

FIG. 10 is an example flowchart 1000 of a method for mapping principals and resources from a cloud computing environment into a security graph utilizing a unified identity mapper, implemented in accordance with an embodiment.

At S1010, identity data is received from a cloud computing environment. Identity data may include information relating to principals, resources, and connections between principals and resources. For example, information may be identifiers, such as username, account name, role identifier, service account identifier, network address, IP address, and the like. Connections between principals and resources may be defined by policies, permissions, and the like. For example, a policy may indicate that a user account associated with a certain predefined role may access a first plurality of resources in a cloud computing environment.

At S1020, a plurality of principals from the cloud computing environment are each mapped to a corresponding principal node of a security graph. In an embodiment mapping includes generating the principal node and associating it with the principal. Associating a principal with a principal node may include, for example, storing a unique identifier of the principal on the principal node. A principal node may be, for example, an identity node. For example, a user account is a principal, and the user account is mapped to a principal node representing the user account. The security graph may further store metadata associated with the user account, such as a username.

At S1030 a plurality of resources from the cloud computing environment are each mapped to a corresponding resource node of the security graph. In an embodiment, mapping is performed by generating a resource node and associating it with the resource. Associating may be performed by storing a unique identifier of the resource on the resource node. A resource node may be, for example, a node representing a virtual machine, a container, a serverless function, a software application, an operating system, a WAF, a gateway, a load balancer, and the like.

In an embodiment, a generated resource node, and a generated principal node, may each store information, for example as data attributes, which points to a corresponding identity, resource, and the like, to which they are mapped, enabling a trace between the representation (e.g., principal node) and the represented object (specific username). In some embodiments, an object (i.e., cloud entity) in a cloud computing environment may be a principal, and also a resource to other principals. For example, a load balancer may be a resource for a user account, but a principal for a web server which utilizes the load balancer. The security graph may further store metadata for a resource node, such as IP address, name in a namespace, etc.

At S1040 a connection is determined between a first cloud entity and a second cloud entity in the cloud computing environment. The first cloud entity and the second cloud entity each may be a principal, or a resource. In an embodiment, determining a connection includes reading a policy, a permission, and the like, and determining a relationship between a first cloud entity and a second cloud entity, wherein the cloud entities form a condition of the policy, permission, and the like. In an embodiment, a cloud entity may be a role, and associated with a role node, implemented as a type of principal node. A role node is associated with a specific role (i.e., set of one or more permissions relating to a resource). Determining a connection may include reading data from a policy in order to determine if a permission exists to allow communication between the principal node and another principal node or a resource node. In an embodiment, a determined connection is stored as an edge in the security graph. For example, a connection indicating that a principal can access a resource may be stored as a principal node connected by an edge to a resource node, wherein the edge indicates a "can access" type connection.

At S1050 a check is performed if additional data is received. If yes, execution continues at S1010. Otherwise, execution may terminate. In some embodiments, a check may be performed to determine if additional principals need to be mapped. If yes, execution continues at S1020. In yet other embodiments, a check may be performed to determine if additional resources need to be mapped. If yes, execution may continue at S1030.

Figure 11:
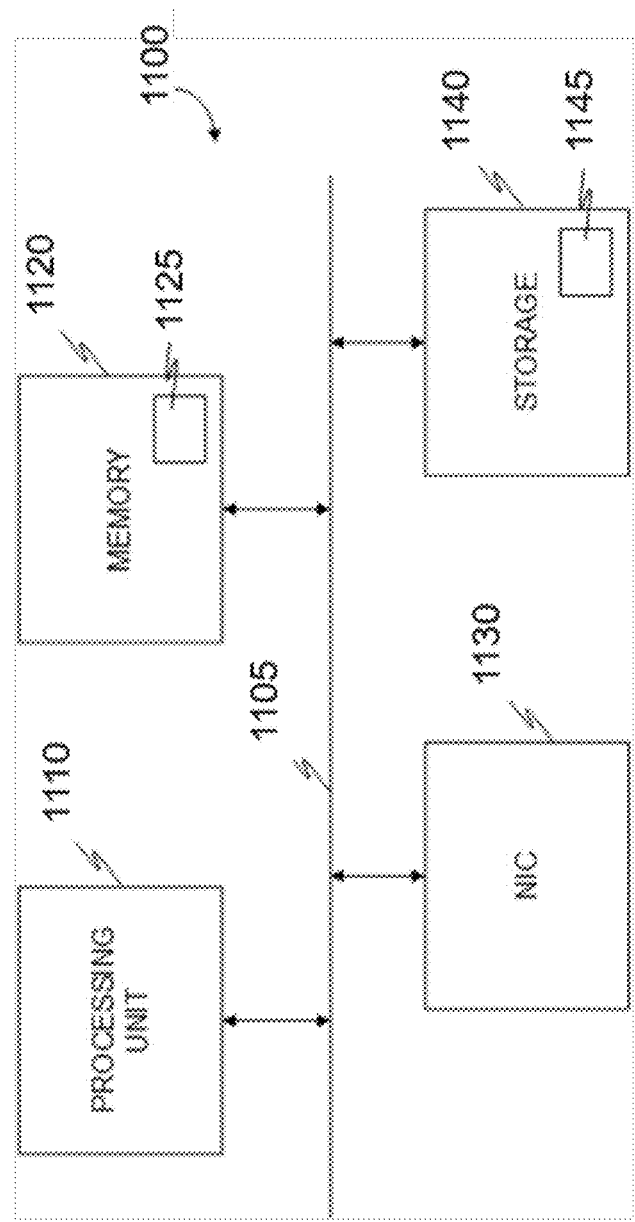
FIG. 11 is a schematic illustration of a mapper, implemented according to an embodiment.

FIG. 11 is an example of a schematic illustration of a mapper 230 implemented according to an embodiment. The mapper may be a physical or virtual machine. The mapper 230 includes at least one processing element 1110, for example, a central processing unit (CPU). In an embodiment, the processing element 1110 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing element 1110 is coupled via a bus 1105 to a memory 1120. The memory 1120 may include a memory portion 1122 that contains instructions that when executed by the processing element 1110 performs the method described in more detail herein. The memory 1120 may be further used as a working scratch pad for the processing element 1110, a temporary storage, and others, as the case may be. The memory 1120 may be a volatile memory such as, but not limited to random access memory (RAM), or non-volatile memory (NVM), such as, but not limited to, Flash memory.

The processing element 1110 may be coupled to a network interface controller (NIC) 1130, which provides connectivity to one or more cloud computing environments, via a network.

The processing element 1110 may be further coupled with a storage 1140. Storage 1140 may be used for the purpose of holding a copy of the method executed in accordance with the disclosed technique. The storage 740 may include a storage portion 1145 containing a security graph model (i.e., a data structure for a principal, and a data structure for a resource) into which principals and resources of a cloud environment are mapped to corresponding nodes, and connections between the nodes are determined based on data received from the cloud environment indicating permissions of each principal to act on one or more resources.

The processing element 1110 and/or the memory 1120 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

It should be understood that the embodiments described herein are not limited to the specific architecture illustrated in FIG. 11, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inspecting a resource deployed in a cloud computing environment for a cybersecurity threat, comprising:
    detecting a virtual instance deployed in a cloud computing environment, the virtual instance associated with an original disk;
    generating a cloned disk directly based on the original disk, wherein the original disk includes a disk descriptor pointing to a storage address of a cloud storage system;
    generating a cloned disk descriptor associated with the cloned disk, the cloned disk descriptor pointing to the storage address;
    dereferencing a pointer of the disk descriptor of the original disk;
    generating a pointer for the cloned disk descriptor based on the dereferenced pointer of the disk descriptor of the original disk;
    inspecting the cloned disk for a cybersecurity object, the cybersecurity object indicating a cybersecurity risk; and
    releasing the cloned disk in response to completing inspection of the cloned disk.

2. The method of claim 1, further comprising:
    generating a representation in a security database of: the virtual instance, the original disk, and the cybersecurity object.

3. The method of claim 2, further comprising:
    connecting the representation of the virtual instance with the representation of the cybersecurity object, in response to detecting the cybersecurity object on the cloned disk.

4. The method of claim 2, wherein the security database includes a representation of the cloud computing environment.

5. The method of claim 1, further comprising:
    determining that the original disk is an encrypted disk;
    detecting an encryption key utilized to decrypt the encrypted disk; and
    generating an encryption pointer for the cloned disk descriptor to the detected encryption key.

6. The method of claim 1, further comprising:
    inspecting the cloned disk for any one of: an exposure, a vulnerability, a malware, a ransomware, a spyware, a bot, a weak password, an exposed password, an exposed certificate, a misconfiguration, a suspicious event, and any combination thereof.

7. The method of claim 1, further comprising:
    accessing an inspection account in the cloud computing environment; and
    generating the cloned disk in the inspection account.

8. The method of claim 1, further comprising:
    providing access to the cloned disk to an inspector workload, the inspector workload deployed in an inspection environment communicatively coupled with the cloud computing environment.

9. The method of claim 1, further comprising:
    mounting the cloned disk to an inspector workload, wherein the inspector workload is deployed in an inspection environment and configured to inspect the cloned disk for the cybersecurity object.

10. A non-transitory computer-readable medium storing a set of instructions for inspecting a resource deployed in a cloud computing environment for a cybersecurity threat, the set of instructions comprising:
    one or more instructions that, when executed by one or more processors of a device, cause the device to:
        detect a virtual instance deployed in a cloud computing environment, the virtual instance associated with an original disk;
        generate a cloned disk directly based on the original disk, wherein the original disk includes a disk descriptor pointing to a storage address of a cloud storage system;
        generate a cloned disk descriptor associated with the cloned disk, the cloned disk descriptor pointing to the storage address;
        dereference a pointer of the disk descriptor of the original disk;
        generate a pointer for the cloned disk descriptor based on the dereferenced pointer of the disk descriptor of the original disk;
        inspect the cloned disk for a cybersecurity object, the cybersecurity object indicating a cybersecurity risk; and release the cloned disk in response to completing inspection of the cloned disk.

11. A system for inspecting a resource deployed in a cloud computing environment for a cybersecurity threat comprising:
a processing circuitry;
a memory, the memory containing instructions that, when executed by the processing circuitry, configure the system to:
detect a virtual instance deployed in a cloud computing environment, the virtual instance associated with an original disk;
generate a cloned disk directly based on the original disk, wherein the original disk includes a disk descriptor pointing to a storage address of a cloud storage system;
generate a cloned disk descriptor associated with the cloned disk, the cloned disk descriptor pointing to the storage address;
dereference a pointer of the disk descriptor of the original disk;
generate a pointer for the cloned disk descriptor based on the dereferenced pointer of the disk descriptor of the original disk;
inspect the cloned disk for a cybersecurity object, the cybersecurity object indicating a cybersecurity risk; and
release the cloned disk in response to completing inspection of the cloned disk.

12. The system of claim 11, wherein the memory contains further instructions which when executed by the processing circuitry further configure the system to:
generate a representation in a security database of:
the virtual instance, the original disk, and the cybersecurity object.

13. The system of claim 12, wherein the memory contains further instructions which when executed by the processing circuitry further configure the system to:
connect the representation of the virtual instance with the representation of the cybersecurity object, in response to detecting the cybersecurity object on the cloned disk.

14. The system of claim 12, wherein the security database includes a representation of the cloud computing environment.

15. The system of claim 11, wherein the memory contains further instructions which when executed by the processing circuitry further configure the system to:
determine that the original disk is an encrypted disk;
detect an encryption key utilized to decrypt the encrypted disk; and
generate an encryption pointer for the cloned disk descriptor to the detected encryption key.

16. The system of claim 11, wherein the memory contains further instructions which when executed by the processing circuitry further configure the system to:
inspect the cloned disk for any one of:
an exposure, a vulnerability, a malware, a ransomware, a spyware, a bot, a weak password, an exposed password, an exposed certificate, a misconfiguration, a suspicious event, and any combination thereof.

17. The system of claim 11, wherein the memory contains further instructions which when executed by the processing circuitry further configure the system to:
access an inspection account in the cloud computing environment; and
generate the cloned disk in the inspection account.

18. The system of claim 11, wherein the memory contains further instructions which when executed by the processing circuitry further configure the system to:
provide access to the cloned disk to an inspector workload, the inspector workload deployed in an inspection environment communicatively coupled with the cloud computing environment.

* * * * *